(12) United States Patent
Schmitz et al.

(10) Patent No.: US 10,732,131 B2
(45) Date of Patent: Aug. 4, 2020

(54) CURVED DIGITAL X-RAY DETECTOR FOR WELD INSPECTION

(71) Applicant: General Electric Company, Schenectady, NY (US)

(72) Inventors: Andrea Marie Schmitz, Niskayuna, NY (US); Aaron Judy Couture, Schenectady, NY (US); Douglas Albagli, Clifton Park, NY (US); Shana Marie Telesz, State College, PA (US); Fulton Jose Lopez, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/122,187

(22) PCT Filed: Mar. 9, 2015

(86) PCT No.: PCT/US2015/019468
§ 371 (c)(1),
(2) Date: Aug. 29, 2016

(87) PCT Pub. No.: WO2015/138329
PCT Pub. Date: Sep. 17, 2015

(65) Prior Publication Data
US 2016/0370303 A1 Dec. 22, 2016

Related U.S. Application Data

(60) Provisional application No. 61/952,268, filed on Mar. 13, 2014.

(51) Int. Cl.
*G01T 1/20* (2006.01)
*G01N 23/04* (2018.01)
*G01N 23/083* (2018.01)

(52) U.S. Cl.
CPC .......... *G01N 23/04* (2013.01); *G01N 23/083* (2013.01); *G01N 2223/301* (2013.01);
(Continued)

(58) Field of Classification Search
CPC ....... G01T 1/204; G01T 1/2045; G01T 1/202; G01T 1/178; G01T 1/2985
See application file for complete search history.

(56) References Cited

U.S. PATENT DOCUMENTS 4,338,521 A * 7/1982 Shaw ................... G01T 1/1644
250/367
5,319,206 A 6/1994 Lee et al.
(Continued)

FOREIGN PATENT DOCUMENTS

CN 101114668 A 1/2008
CN 101718912 A 6/2010
(Continued)

OTHER PUBLICATIONS

"Weld Inspection", GE Measurement & Control.
(Continued)

*Primary Examiner* — David P Porta
*Assistant Examiner* — Mamadou Faye
(74) *Attorney, Agent, or Firm* — Mintz Levin Cohn Ferris Glovsky and Popeo, P.C.

(57) ABSTRACT

Aspects of the present disclosure relate to the fabrication and use of a curved X-ray detector panel, suitable for use in imaging pipes or other curved objects to which the curved detector may be fitted. In certain embodiments, the curved detector panel is fabricated using a thin, flexible substrate that is unbreakable or resistant to breaking.

20 Claims, 12 Drawing Sheets

(52) U.S. Cl.
CPC . *G01N 2223/505* (2013.01); *G01N 2223/628* (2013.01); *G01N 2223/629* (2013.01)

(56) References Cited

U.S. PATENT DOCUMENTS

| | | | |
|---|---|---|---|
| 5,357,121 | A | 10/1994 | Miyashita et al. |
| 5,381,014 | A | 1/1995 | Jeromin et al. |
| 5,399,884 | A | 3/1995 | Wei et al. |
| 5,614,720 | A | 3/1997 | Morgan et al. |
| 5,721,422 | A | 2/1998 | Bird |
| 6,181,769 | B1 | 1/2001 | Hoheisel et al. |
| 6,205,199 | B1 | 3/2001 | Polichar et al. |
| 6,262,421 | B1 | 7/2001 | Tran |
| 6,303,943 | B1 | 10/2001 | Yu et al. |
| 6,341,153 | B1* | 1/2002 | Rivera ............... G01N 23/046 378/10 |
| 6,380,543 | B1 | 4/2002 | Kim |
| 6,426,991 | B1 | 7/2002 | Mattson et al. |
| 6,465,824 | B1 | 10/2002 | Kwasnick et al. |
| 6,483,099 | B1 | 11/2002 | Yu et al. |
| 6,717,150 | B2 | 4/2004 | Hoffman |
| 6,740,884 | B2 | 5/2004 | Lee et al. |
| 6,841,784 | B2 | 1/2005 | Brahme et al. |
| 6,849,843 | B2* | 2/2005 | Ansorge ............ H01L 27/14603 250/208.1 |
| 6,867,418 | B2 | 3/2005 | Suzuki et al. |
| 6,901,159 | B2 | 5/2005 | Baertsch et al. |
| 6,904,124 | B2 | 6/2005 | Staver et al. |
| 6,970,586 | B2 | 11/2005 | Baertsch et al. |
| 6,982,424 | B2 | 1/2006 | Vafi et al. |
| 7,053,381 | B2 | 5/2006 | Shaw et al. |
| 7,078,702 | B2 | 7/2006 | Ringermacher et al. |
| 7,081,627 | B2 | 7/2006 | Heismann et al. |
| 7,105,830 | B2 | 9/2006 | Nagano et al. |
| 7,122,804 | B2 | 10/2006 | Mollov |
| 7,180,075 | B2 | 2/2007 | Brabec et al. |
| 7,196,331 | B2 | 3/2007 | Heismann |
| 7,211,825 | B2 | 5/2007 | Shih et al. |
| 7,259,037 | B2 | 8/2007 | Shih |
| 7,366,280 | B2 | 4/2008 | Lounsberry |
| 7,379,528 | B2 | 5/2008 | Mattson et al. |
| 7,486,766 | B1 | 2/2009 | Nagarkar et al. |
| 7,560,702 | B2 | 7/2009 | Meirav et al. |
| 7,605,875 | B2 | 10/2009 | Baek et al. |
| 7,606,346 | B2 | 10/2009 | Tkaczyk et al. |
| 7,838,994 | B2 | 11/2010 | Shibayama et al. |
| 7,897,929 | B2 | 3/2011 | Albagli et al. |
| 7,947,960 | B2 | 5/2011 | Wu et al. |
| 7,947,961 | B2 | 5/2011 | Nys |
| 7,964,903 | B2 | 6/2011 | Joo et al. |
| 8,076,647 | B2 | 12/2011 | Danielsson et al. |
| 8,084,743 | B2 | 12/2011 | Saito et al. |
| 8,120,683 | B1 | 2/2012 | Tumer et al. |
| 8,173,969 | B2* | 5/2012 | Nishino ............... G01T 1/2018 250/370.08 |
| 8,222,158 | B2 | 7/2012 | Mochizuki et al. |
| 8,300,125 | B2 | 10/2012 | Ng et al. |
| 8,343,779 | B2 | 1/2013 | Buergi et al. |
| 8,405,832 | B2 | 3/2013 | Schmaelzle et al. |
| 8,477,125 | B2 | 7/2013 | Park et al. |
| 8,605,862 | B2 | 12/2013 | Granfors et al. |
| 2002/0079458 | A1 | 6/2002 | Zur |
| 2003/0001222 | A1 | 1/2003 | Street et al. |
| 2003/0010923 | A1 | 1/2003 | Zur |
| 2003/0030004 | A1 | 2/2003 | Dixon et al. |
| 2003/0031296 | A1* | 2/2003 | Hoheisel ............ H01L 27/14658 378/98.8 |
| 2003/0122083 | A1 | 7/2003 | Possin et al. |
| 2003/0210761 | A1 | 11/2003 | Hoffman et al. |
| 2003/0227997 | A1 | 12/2003 | Petrick et al. |
| 2003/0234364 | A1 | 12/2003 | Hennessy et al. |
| 2004/0016886 | A1* | 1/2004 | Ringermacher .. H01L 27/14601 250/370.11 |
| 2004/0085598 | A1 | 5/2004 | Kokeguchi et al. |
| 2004/0113086 | A1 | 6/2004 | Heismann et al. |
| 2004/0170861 | A1 | 9/2004 | Culligan et al. |
| 2004/0190676 | A1 | 9/2004 | Kojima et al. |
| 2004/0229051 | A1 | 11/2004 | Schaepkens et al. |
| 2005/0008213 | A1 | 1/2005 | Shankarappa et al. |
| 2005/0178971 | A1 | 8/2005 | Hoge |
| 2005/0236614 | A1 | 10/2005 | Parker |
| 2006/0008054 | A1 | 1/2006 | Ohara |
| 2006/0256922 | A1 | 11/2006 | Imai et al. |
| 2006/0282946 | A1 | 12/2006 | Meyer |
| 2007/0039102 | A1 | 2/2007 | Thompson |
| 2007/0085015 | A1 | 4/2007 | Castleberry |
| 2007/0257253 | A1 | 11/2007 | Im et al. |
| 2007/0262266 | A1 | 11/2007 | Hoheisel et al. |
| 2007/0289625 | A1 | 12/2007 | Demadrille et al. |
| 2007/0295966 | A1 | 12/2007 | Watanabe et al. |
| 2007/0295973 | A1 | 12/2007 | Jinbo et al. |
| 2008/0078940 | A1 | 4/2008 | Castleberry et al. |
| 2008/0135891 | A1 | 6/2008 | Arias et al. |
| 2008/0149852 | A1 | 6/2008 | Shoji et al. |
| 2008/0267345 | A1* | 10/2008 | Nagumo .............. G01B 15/025 378/11 |
| 2008/0278068 | A1 | 11/2008 | Huang et al. |
| 2009/0026379 | A1 | 1/2009 | Yaegashi et al. |
| 2009/0026383 | A1 | 1/2009 | Kim et al. |
| 2009/0166512 | A1 | 7/2009 | Fuerst et al. |
| 2009/0279029 | A1 | 11/2009 | Kunii et al. |
| 2009/0285352 | A1 | 11/2009 | Schmitt |
| 2009/0290680 | A1* | 11/2009 | Tumer .................. G01T 1/247 378/62 |
| 2010/0059804 | A1 | 3/2010 | Hayashi et al. |
| 2010/0102242 | A1 | 4/2010 | Burr et al. |
| 2010/0102300 | A1 | 4/2010 | Burroughes et al. |
| 2010/0148072 | A1 | 6/2010 | Fuerst et al. |
| 2010/0155578 | A1 | 6/2010 | Matsumoto |
| 2010/0193691 | A1* | 8/2010 | Ishii ................. H01L 27/14663 250/366 |
| 2010/0224784 | A1 | 9/2010 | Homma et al. |
| 2010/0232575 | A1* | 9/2010 | Hall .................... A61B 6/4233 378/189 |
| 2010/0305427 | A1 | 12/2010 | Huber et al. |
| 2010/0320391 | A1 | 12/2010 | Antonuk |
| 2011/0024711 | A1 | 2/2011 | Li et al. |
| 2011/0026685 | A1 | 2/2011 | Zilberstein et al. |
| 2011/0042656 | A1 | 2/2011 | Burroughes et al. |
| 2011/0049661 | A1 | 3/2011 | Maehara et al. |
| 2011/0127504 | A1 | 6/2011 | Halls et al. |
| 2011/0168905 | A1 | 7/2011 | Yabuta et al. |
| 2011/0204341 | A1 | 8/2011 | Brown et al. |
| 2011/0305315 | A1 | 12/2011 | Park et al. |
| 2012/0018627 | A1 | 1/2012 | Tredwell et al. |
| 2012/0037809 | A1 | 2/2012 | Levene et al. |
| 2012/0068076 | A1 | 3/2012 | Daghighian |
| 2012/0097858 | A1 | 4/2012 | Morf |
| 2012/0121067 | A1 | 5/2012 | Hayden et al. |
| 2012/0153173 | A1* | 6/2012 | Chang ............... H01L 27/14603 250/370.08 |
| 2012/0161018 | A1 | 6/2012 | Shin |
| 2012/0161270 | A1 | 6/2012 | Maehara et al. |
| 2012/0193542 | A1 | 8/2012 | Yamada |
| 2012/0201347 | A1 | 8/2012 | Prentice et al. |
| 2012/0201348 | A1 | 8/2012 | Knight et al. |
| 2012/0223238 | A1 | 9/2012 | Stark |
| 2012/0259378 | A1 | 10/2012 | Heinrichs et al. |
| 2012/0267535 | A1 | 10/2012 | Nakatsugawa et al. |
| 2013/0082264 | A1 | 4/2013 | Couture et al. |
| 2013/0092840 | A1 | 4/2013 | Ohta et al. |
| 2013/0140464 | A1 | 6/2013 | Iwakiri et al. |
| 2013/0140568 | A1 | 6/2013 | Miyamoto et al. |
| 2013/0170616 | A1* | 7/2013 | Mruthyunjaya ....... G01N 23/04 378/62 |
| 2014/0010353 | A1* | 1/2014 | Lalena .................. A61B 6/465 378/98 |

(56) References Cited

U.S. PATENT DOCUMENTS

| | | |
|---|---|---|
| 2014/0014843 A1 | 1/2014 | Ikeda et al. |
| 2014/0054442 A1 | 2/2014 | Huang et al. |

FOREIGN PATENT DOCUMENTS

| | | |
|---|---|---|
| CN | 201681056 U | 12/2010 |
| CN | 101975787 A | 2/2011 |
| CN | 102539454 A | 7/2012 |
| CN | 102576715 A | 7/2012 |
| CN | 202903698 U | 4/2013 |
| DE | 2520065 B1 | 7/1976 |
| EP | 2328177 A2 | 6/2011 |
| GB | 2317742 A | 4/1998 |
| WO | 9423458 A2 | 10/1994 |
| WO | 2008148815 A1 | 12/2008 |

OTHER PUBLICATIONS

Phoenix x/act: http://www/ge-mcs.com/download/x-ray/phoenix-x-ray/GEIT-31342EN_x-act.pdf, Jan. 1, 2010, Internet.

Aaron Judy Couture et al., filed Dec. 27, 2012, U.S. Appl. No. 13/728,052.

Aaron Judy Couture et al., filed Aug. 29, 2013, U.S. Appl. No. 14/014,003.

Gautam Parthasarathy et al., filed Jul. 31, 2013, U.S. Appl. No. 13/955,355.

Aaron Judy Couture et al., filed Dec. 12, 2013, U.S. Appl. No. 14/103,989.

Aaron Judy Couture et al., filed Dec. 17, 2013, U.S. Appl. No. 14/109,454.

Ri-an Zhao et al., filed Dec. 30, 2013, U.S. Appl. No. 14/144,253.

Zhao et al., "X-ray imaging using amorphous selenium: Feasibility of a flat panel self-scanned detector for digital radiology", Medical Physics, vol. No. 22, Issue No. 10, pp. 1595-1604, Jul. 13, 1995.

Granfors et al., "Performance of a 41×41—cm2 amorphous silicon flat panel x-ray detector for radiographic imaging applications", Medical Physics, vol. No. 27, Issue No. 06, pp. 1324-1331, Mar. 13, 2000.

Liu et al., "An Alternate Line Erasure and Readout (ALER) Method for Implementing Slot-Scan Imaging Technique With a Flat-Panel Detector-Initial Experiences", IEEE Transactions on Medical Imaging, , vol. No. 25, Issue No. 04, pp. 496-502, Apr. 2006.

Kao et al., "Fabrication of organic light-emitting devices on flexible substrates using a combined roller imprinting and photolithograph y-patterning technique, Journal of Vacuum Science & Technology B: Microelectronics and Nanometer Structures," IEEE, vol. No. 24, Issue No. 03, pp. 1278-1282, May 2006.

Greener et al., "Moisture Permeability Through Multilayered Barrier Films as Applied to Flexible OLED Display", Journal of Applied Polymer Science,vol. No. 106, Issue No. 05, pp. 3534-3542, 2007.

Ng et al., "Flexible image sensor array with bilk heterojunction organic photodiode", Applied Physics Letters, vol. No. 92, pp. 213303-1-3, 2008.

Gong et al., "High-Detectivity Polymer Photodectors with Spectral Response from 300nm to 1450nm", Science, vol. No. 325, pp. 1665-1667, 2009.

Ng et al., "Characterization of Charge Collection in Photodiodes Under Mechanical Strain: Comparison Between Organic Bulk Heterojunction and Amorphous Silicon", Advanced Materials, vol. No. 21, Issue No. 18, pp. 1855-1859, 2009.

Xu et al., "Organic Photodetector Arrays with Indium Tin Oxide Electrodes Patterned Using Directly Transferred Metal Masks", Applied Physics Letters 94 from the American Institute of Physics, vol. No. 94, pp. 043313-1-3, 2009.

Kim et al., "Characteristic Study of Multi-layer using Hybrid Method for Digital X-ray Detector", IEEE Nuclear Science Symposium Conference Record, pp. 3327-3329, 2009.

Weisfield, et al., "Performance analysis of a 127-micron pixel large-area TFT/photodiode array with boosted fill factor", www.dpix.com/technology/Documents/, Jul. 25, 2011.

Lujan et al., "Flexible X-Ray Detector Array Fabricated With Oxide Thin-Film Transistors", IEEE Electron Device Letters, vol. No. 33, Issue No. 5, pp. 688-690, May 2012.

Shorey et al., "Development of Substrates Featuring Through Glass Vias (TGV) for 3D-IC Integration",Downloaded from the Internet:<http://www.coming.com/WorkArea/downloadasset.aspx?id=47685> on Dec. 10, 2013, pp. 1-3.

U.S. Non-Final Office Action issued in connection with Related U.S. Appl. No. 13/728,052 dated May 12, 2014.

U.S. Non-Final Office Action issued in connection with Related U.S. Appl. No. 13/955,355 dated Sep. 25, 2014.

PCT Search Report and Written Opinion issued in connection with Related PCT Application No. PCT/US2014/054558 dated Nov. 20, 2014.

U.S. Final Office Action issued in connection with Related U.S. Appl. No. 13/728,052 dated Nov. 24, 2014.

PCT Search Report and Written Opinion issued in connection with Related PCT Application No. PCT/US2014/054560 dated Dec. 5, 2014.

U.S. Non-Final Office Action issued in connection with Related U.S. Appl. No. 14/103,989 dated Jan. 2, 2015.

U.S. Non-Final Office Action issued in connection with Related U.S. Appl. No. 14/014,003 dated Feb. 2, 2015.

U.S. Non-Final Office Action issued in connection with Related U.S. Appl. No. 14/109,454 dated Feb. 23, 2015.

U.S. Non-Final Office Action issued in connection with Related U.S. Appl. No. 14/144,253 dated May 27, 2015.

U.S. Non-Final Office Action issued in connection with Related U.S. Appl. No. 13/955,355 dated May 29, 2015.

U.S. Final Office Action issued in connection with Related U.S. Appl. No. 14/103,989 dated Jun. 9, 2015.

U.S. Final Office Action issued in connection with Related U.S. Appl. No. 14/109,454 dated Jul. 9, 2015.

U.S. Non-Final Office Action issued in connection with Related U.S. Appl. No. 13/728,052 dated Aug. 6, 2015.

U.S. Final Office Action issued in connection with Related U.S. Appl. No. 14/014,003 dated Aug. 28, 2015.

U.S. Non-Final Office Action issued in connection with Related U.S. Appl. No. 14/103,989 dated Nov. 12, 2015.

U.S. Non-Final Office Action issued in connection with Related U.S. Appl. No. 14/109,454 dated Nov. 27, 2015.

U.S. Notice of Allowance issued in connection with Related U.S. Appl. No. 14/144,253 dated Dec. 7, 2015.

U.S. Final Office Action issued in connection with Related U.S. Appl. No. 13/728,052 dated Dec. 31, 2015.

Unofficial English Translation of Chinese Office Action issued in connection with Related CN Application No. 2013107415294 dated Jan. 4, 2016.

U.S. Final Office Action issued in connection with Related U.S. Appl. No. 13/955,355 dated Feb. 12, 2016.

Unofficial English Translation of Chinese Office Action issued in connection with Related CN Application No. 201410433906.2 dated Apr. 22, 2016.

U.S. Final Office Action issued in connection with Related U.S. Appl. No. 14/103,989 dated May 19, 2016.

U.S. Non-Final Office Action issued in connection with Related U.S. Appl. No. 13/955,355 dated Aug. 1, 2016.

U.S. Non-Final Office Action issued in connection with Related U.S. Appl. No. 13/728,052 dated Aug. 19, 2016.

U.S. Non-Final Office Action issued in connection with Related U.S. Appl. No. 14/103,989 dated Mar. 2, 2017.

U.S. Final Office Action issued in connection with Related U.S. Appl. No. 13/728,052 dated Mar. 10, 2017.

* cited by examiner

CURVED DIGITAL X-RAY DETECTOR FOR WELD INSPECTION

CROSS-REFERENCE TO RELATED APPLICATIONS

This application is a national stage application under 35 U.S.C. § 371(c) of prior filed, co-pending PCT application serial number PCT/US2015/019468, filed on Mar. 9, 2015 which claims priority to and benefit of U.S. Provisional Patent Application No. 61/952,268, entitled "CURVED DIGITAL X-RAY DETECTOR FOR WELD INSPECTION", filed Mar. 13, 2014. The above-listed applications are herein incorporated by reference in their entirety for all purposes.

BACKGROUND

The subject matter disclosed herein relates to curved X-ray detectors.

Current solutions for radiographic inspection of pipes and pipe welds are often based on exposing a radiation sensitive film that is curved to fit the pipe to an X-ray source. The film may then be developed and reviewed for assessing the state of a weld or, in other instances, some other pipe health or quality metric. Such film-based approaches are slow, time consuming and, notably, do not generate digital images, absent some form of conversion of the film. Further, such film-based approaches do not allow for efficient archival, for automated analysis or for remote review.

To the extent digital systems exits for automated pipe girth inspection, such systems are slow and bulky. In particular, digital X-ray detectors are typically fabricated on thick, inflexible glass substrates. The glass substrate requires the substrate to remain in a flat, rigid conformation, which may make imaging in compliance with regulatory requirements difficult, as ASME and ASMT requirements constrain the distance that the detector can be from the surface of the pipe. Thus, a flat, glass substrate may allow for imaging only limited portions of a pipe at a time while remaining in compliance with the requirements.

Further, X-ray detectors based on a glass substrate have a limited ruggedness specification, including a maximum 30 cm drop height, which may be unsuitable for field work. As a result, in a portable detector the glass substrate requires significant package thickness and weight to protect the fragile glass substrate from breaking during use, transportation and storage. Trade-offs may, therefore, be required to balance detector ruggedness against detector weight and thickness. With the preceding in mind, further developments are needed with respect to digital X-ray detectors suitable for imaging pipes or other industrial or commercial conduits.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In a first embodiment, a method for imaging a pipe is provided. In accordance with this method, a curved X-ray sensor of a portable digital detector is positioned with respect to a portion of a pipe to be imaged. Digital signals from the X-ray sensor corresponding to the incidence of X-rays transmitted through the portion of the pipe are read out. One or more images are generated based on the digital signals, wherein the one or more images depict X-ray transmission through the portion of the pipe.

In a further embodiment, a portable X-ray detector is provided. The portable X-ray detector includes a housing having: a power supply or power supply connector; one or more interface circuits configured to acquire digital signals from readout circuits, and a connector assembly. The portable X-ray detector also includes an interchangeable curved X-ray sensor having: a complementary connector assembly configured to removably connect to the connector assembly; a detector panel configured to generate signals in response to incident X-rays; and one or more readout circuits configured to generate digital signals based upon the signals generated by the detector panel.

In an additional embodiment, a method for imaging a pipe is provided. In accordance with this method, a curved X-ray sensor conforming in size and curvature to a pipe section is selected. The selected curved X-ray sensor is attached to a portable detector housing. The portable detector housing comprises at least the readout circuitry and power source for the selected curved X-ray sensor. The selected curved X-ray sensor, while connected to the portable detector housing, is positioned against the pipe section. Signals from the selected curved X-ray sensor generated in response to X-rays transmitted through the pipe section are acquired. The signals or an image generated from the signals are analyzed for a defect in the pipe section or a weld present in the pipe section.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
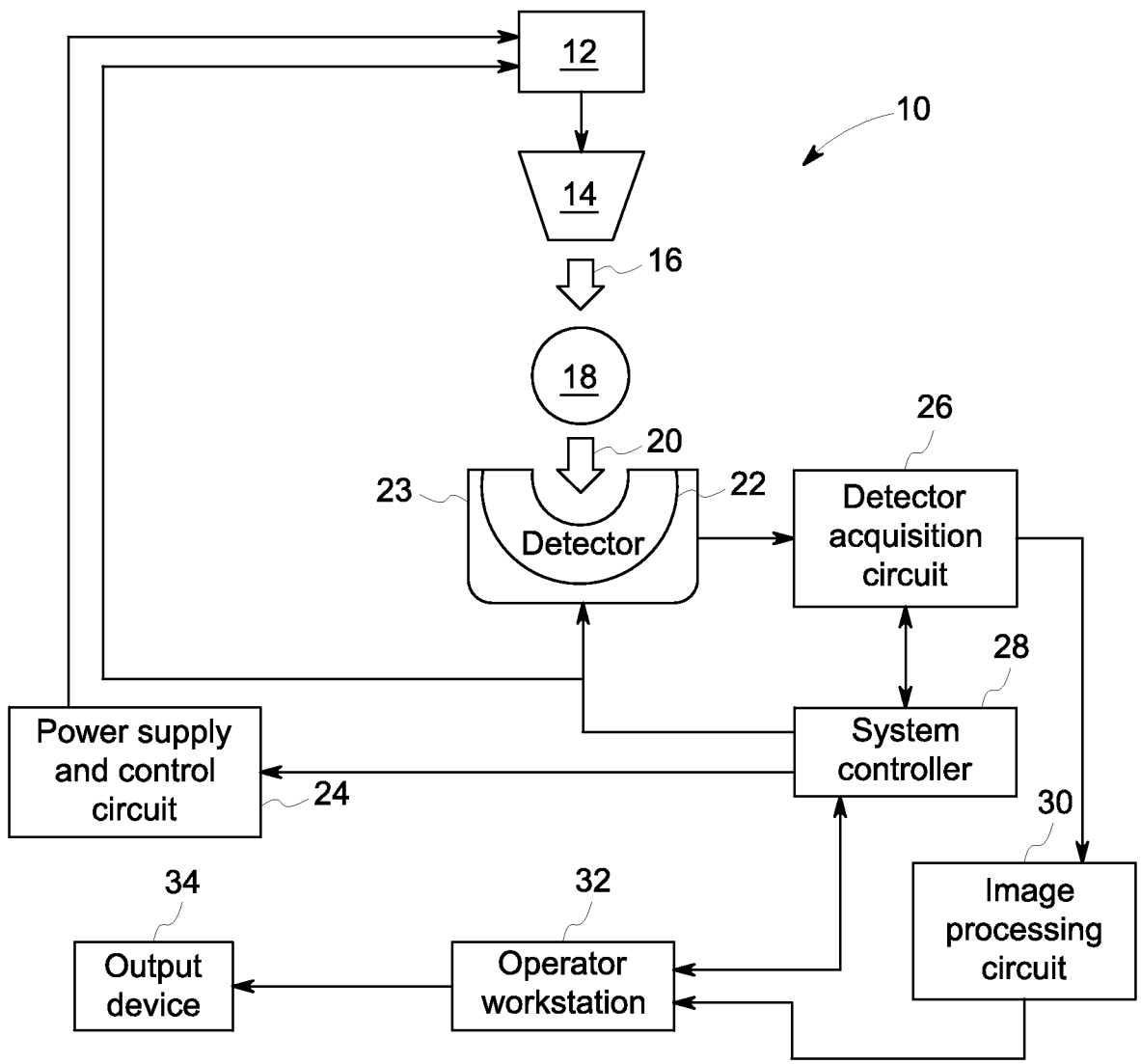
FIG. 1 is a schematic block diagram of an X-ray imaging system, in accordance with an example embodiment of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Any numerical examples in the following discussion are intended to be non-limiting, and thus additional numerical values, ranges, and percentages are within the scope of the disclosed embodiments. Furthermore, it should also be understood that terms such as "top," "above," "over," "on," and the like are words of convenience and are not to be construed as limiting terms. In addition, like reference characters designate like or corresponding parts throughout the several views shown in the figures.

The present discussion pertains to the fabrication and use of an X-ray detector that may be used to provide an efficient, ruggedized, compact digital solution for pipe and pipe weld inspection, as well as for other uses. In certain embodiments, the X-ray detector may incorporate a thin, bendable substrate (i.e., a flexible substrate) that allows other components of the detector to be mounted on a rigid, curved mount to form a rugged, light-weight imaging detector. Such a curved detector, when used for pipe and pipe weld inspection, would be in intimate contact or close proximity to the interior or exterior surface of the pipe and would allow generation of digital images. Further, the flexibility of the substrate may allow for other useful conformations of the X-ray sensor assembly, such as to facilitate imaging near elbow-joints, flanges and/or to accommodate a weld fillet. Such a digital detector with the full active area in close proximity to the pipe would decrease the number of image acquisitions as compared to a flat panel X-ray detector and improve the workflow by decreasing the acquisition time as compared to film imaging.

With the preceding in mind, and turning to FIG. 1, an example of an X-ray imaging system 10 suitable for use with a detector (i.e., X-ray sensor 22) as discussed herein is described. FIG. 1 is a schematic block diagram of an embodiment of an X-ray imaging system 10. In the example embodiment, X-ray imaging system 10 is configured to acquire and process X-ray image data. X-ray imaging system 10 includes an X-ray source 12 and an X-ray sensor (i.e., detector) 22. In one embodiment, X-ray source 12 is suitable for imaging in an industrial context, such as for imaging pipe welds. Though FIG. 1 depicts an imaging source 12 external to the pipe 18 undergoing imaging, in other implementations, the X-ray source 12 may actually be positioned within the pipe 18 during an imaging operation. FIG. 1 also depicts a collimator 14 that may be employed to block, direct, focus, or otherwise constrain the X-ray emissions of the source 12. As will be appreciated, depending on the implementation, such a collimator 14 may be present or absent.

In the example embodiment, X-ray source 12 is controlled by a power supply and control circuit 24 which supplies power and control signals for examination sequences. In various embodiments, exposure timing is controlled automatically by an auto-sensor associated with X-ray source 12. In other embodiments, X-ray source 12 is embodied in one or more radioisotopes wherein power supply and control circuit 24 supplies power and control signals for examination sequences using the radioisotopes.

A portion of the X-ray radiation 16 emitted by the source 12 is attenuated by the target (e.g., pipe 18) and at least some attenuated radiation 20 impacts X-ray sensor 22, such as a sensor having a curved radiographic imaging detector panel. In the depicted example, the X-ray sensor 22 is depicted as being spaced apart from the pipe 18. However, in practice the X-ray sensor 22 may be fitted to or otherwise proximate to (e.g., held against) the section of pipe 18 being imaged.

Though FIG. 1 depicts one implementation in which the X-ray sensor 22 fits to the exterior surface of pipe 18 and source 12 emits X-rays through two walls (i.e., a near wall and a far wall) of the pipe 18, it should be appreciated that other implementations are also possible. For example, In other implementations, the curvature and size of the X-ray sensor 22 may be such that it can be moved and positioned within the pipe 18 (such as along an interior curved surface of the pipe 18), while the X-ray source 12 remains external and emits X-rays through a single wall of the pipe 18 to illuminate the sensor 22. Conversely, the X-ray source 12, such as an isotope-based or panoramic source, may be moved though the pipe 18 while the X-ray sensor 22 is fitted to the exterior curved surface to acquire images through a single wall of the pipe 18.

As shown in FIG. 1, in one embodiment, the X-ray sensor 22 is mounted (such as removably or swappably mounted) in a holder 23 or case, such as by either coupling X-ray sensor 22 to a surface or mechanical support formed in the holder or case 23. In one example, the X-ray sensor 22 and holder 23 components may be temporarily attached using fasteners (snaps or Velcro for example) or mechanical lock-and-release engagements. An electrical connector is used to supply communications and power from the control box to the X-ray sensor. Different X-ray sensors 22 (e.g., having different curvatures, sizes, electrical configurations, and/or spatial or geometric configurations) may be interchanged within the case 23 based on the imaging protocol or subject. For example, different sizes, configurations, or curvatures of X-ray sensor 22 may be provided and removably mounted in the holder 23 depending on the size, curvature, or other configuration parameter (e.g., presence of a weld fillet, proximity of an elbow joint or connectors, and so forth) of a pipe 18 being imaged.

Figure 2:
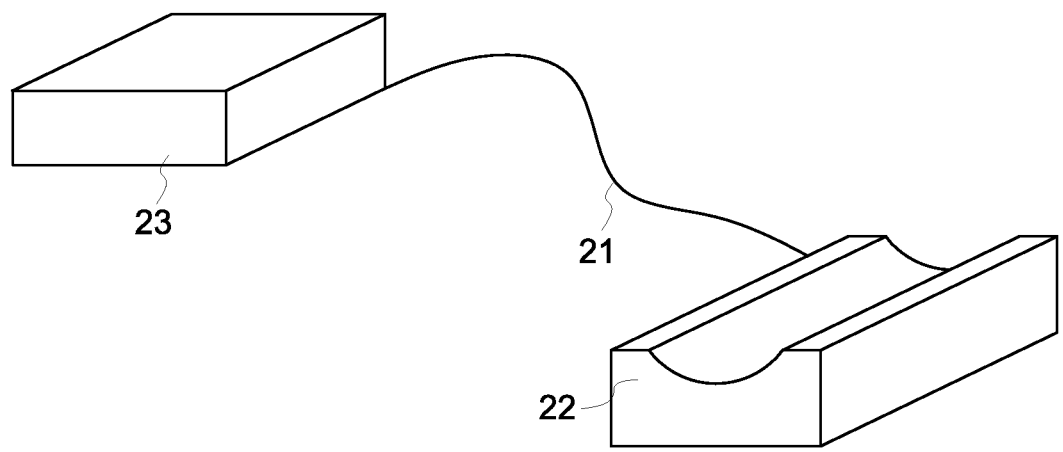
FIG. 2 depicts a simplified view of a removable curved detector and housing, in accordance with an example embodiment of the present disclosure.

An example of such an embodiment is shown in FIG. 2, in which an interchangeable X-ray sensor 22 is shown removed from a portable holder or case 23. In such an embodiments, the X-ray sensor 22 may include various components including, but not limited to, components of a detector panel discussed herein such as a scintillator, a photosensor layer, a thin film transistor array, a substrate, and one or more backing or environmental seal features (e.g., a sensor housing). In addition, the X-ray sensor 22 may contain readout electronics (e.g., data and scan lines and corresponding readout circuitry) as well as circuitry for performing initial conditioning of the signals readout from the panel, such as analog-to-digital conversion circuitry or other circuitry to generate or initially condition digital signals.

Conversely, the holder 23 may have complementary circuitry for acquiring such digital signals from whichever X-ray sensor 22 is connected to the holder 23 and may also contain additional circuitry for processing and/or analyzing the digital signals. In addition, the holder or case 23 may include a power source (e.g., a battery or tethered power connector) as well as communication circuitry for receiving and/or transmitting examination protocols or acquired data over a wired or wireless network.

In the depicted example, the X-ray sensor 22 may be digitally and/or electrically connected to the holder 23 by one or more digital/power interconnectors 21, depicted as a wire connection in FIG. 2. In practice, such connectors may be complementary connecting conductive structure that fit together (i.e., interconnect) when the X-ray sensor 22 is mechanically engaged to the holder 23, though they may also be wire or flex circuit connectors manually engaged by a user as part of removing and connecting a X-ray sensor 22 to a holder 23.

As discussed herein, in certain embodiments X-ray sensor 22 is based on scintillation or on other techniques used in the generation of electrical signals based on incident radiation. For example, a scintillator-based imaging detector typically employs a scintillator material that converts X-ray photons incident on its surface to optical photons. These optical photons may then be converted to electrical signals by photosensor(s), e.g., photodiode(s), also present in the X-ray sensor 22. Conversely, a direct conversion imaging detector directly generates electrical charges in response to incident X-ray photons. The electrical charges can be stored and read out from storage capacitors. As described in detail below, these electrical signals, regardless of the conversion technique employed, are acquired and processed to construct an image of features target (e.g., pipe 18) being imaged.

Turning back to FIG. 1, X-ray sensor 22 can be coupled to a detector acquisition circuit 26, which can be configured to readout electrical signals generated by the X-ray sensor 22. Detector acquisition circuit 26 may also execute various signal processing and filtration functions, such as, for initial adjustment of dynamic ranges and interleaving of digital signals. In the example embodiment, one or both of power supply/control circuit 24 and detector acquisition circuit 26 can be responsive to signals from a system controller 28. System controller 28 can include signal processing circuitry, typically based upon a general purpose or application specific digital computer programmed to process signals according to one or more parameters. System controller 28 may also include memory circuitry for storing programs and routines executed by the computer, as well as configuration parameters and image data and interface circuits.

System 10 can include an image processing circuit 30 configured to receive acquired projection data from detector acquisition circuit 26. Image processing circuit 30 can be configured to process the acquired data to generate one or more images based on X-ray attenuation.

An operator workstation 32 can be communicatively coupled to system controller 28 and/or image processing circuit 30 to allow an operator to initiate and configure X-ray imaging of pipe 18 and to view images generated from X-rays that impinge X-ray sensor 22. For example, system controller 28 is in communication with operator workstation 32 so that an operator, via one or more input devices associated with operator workstation 32, may provide instructions or commands to system controller 28. Operator workstation 32 may be implemented as any suitable processor-based system, including, but not limited to, various forms of digital computers, such as laptops, desktops, workstations, personal digital assistants, servers, tablets, and other appropriate computers. Operator workstation 32 may also be implemented as various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

Similarly, image processing circuit 30 can be in communication with operator workstation 32 such that operator workstation 32 can receive and display the output of image processing circuit 30 on an output device 34, such as a display or printer. Output device 34 may include standard or special purpose computer monitors and associated processing circuitry. In general, displays, printers, operator workstations, and similar devices supplied within system 10 may be local to the data acquisition components or may be remote from these components, such as elsewhere within an industrial facility or in an entirely different location. For example, system 10 may be implemented as a portable X-ray system or kit for imaging pipes for pipe degradation or weld quality. In such an embodiment, some or all of the components of the system 10 may be carried or moved to various industrial sites for image acquisition and the images may be viewed at that site in conjunction with imaging operation or may be viewed remotely either at the time of imaging or afterwards.

Output devices 34 and operator workstations 32 that are remote from the data acquisition components may be operatively coupled to the image acquisition system via one or more configurable networks, such as the Internet or virtual private networks. Though system controller 28, image processing circuit 30, and operator workstation 32 are shown distinct from one another in FIG. 1, these components may actually be embodied in a single processor-based computing system. Alternatively, some or all of these components may be present in distinct processor-based computing systems configured to communicate with one another. For example, image processing circuit 30 may be a component of a distinct reconstruction and viewing workstation.

With respect to the X-ray sensor 22, in certain embodiments discussed herein the X-ray sensor 22 includes some or all of the following layers: (1) a curved substrate which is adhesively mounted to a backing; (2) a thin film transistor (TFT) array and associated photodiodes fabricated on the surface of the substrate opposite the backing, (3) a scintillator deposited on the TFT array, (4) a curved environmental cover and a seal between the environmental cover and the substrate to protect the TFT array, photodiode and scintillator. In addition, data and scan electronics electrically connected to the TFT array and data acquisition electronics to control the readout of the panel may also be provided, as discussed in greater detail below.

With respect to composition of certain of the above-layers, substrate may be composed of rigid or flexible materials such as glass (which may be rigid or flexible), plastic (such as polyethylene terephthalate, polybutylene phthalate, polyethylene naphthalate, polystyrene, polycarbonate, polymethylmethacrylate, polyether sulfone, polyallylate, polyimide, polycycloolefin, norbornene resins, and fluoropolymers), metals and metal foils (such as stainless steel, aluminum, silver and gold, metal oxides, such as titanium oxide and zinc oxide), semiconductors (such as silicon or organic based semiconductors). Substrate material may also include composite materials such as fiber reinforced plastic or carbon composites. Combinations of these or similar materials may also be used to form the substrate.

By using an unbreakable material instead of a fragile glass substrate for the X-ray detector, components and materials designed to absorb bending stress or drop shock can be reduced in size and weight or eliminated, and the overall weight and thickness of the detector can be reduced. Removing costly materials which are used to protect the glass substrate decreases the overall cost of the detector 22. In addition, the number of patterned layers needed for the detector 22 can be reduced by utilizing an un-patterned low cost organic photodiode.

With respect to the TFT and photodiodes, the photodiodes are typically fabricated over the imaging TFT array in layer form and may be formed as inorganic photodiodes or as organic photodiode (OPD) formed in a single or in multiple layers. The photodiode layer may be directly disposed on the TFT array or the design may include one or more layers disposed between the photodiode layer and the TFT array. In one embodiment, a plurality of photodiodes is arranged in the photodiode layer on the TFT array. In one embodiment, the TFT array is electrically connected to the photodiode layer. Each photodiode may include an anode, a cathode, and an organic film between the anode and the cathode, which produces charged carriers in response to absorption of light. The diode material may be lithographically patterned or unpatterned P-I-N a-Si or a solution coated organic photodiode or other suitable thin film photodiode material.

The thin film transistor (TFT) array is typically a two-dimensional array of thin film transistors arranged in a particular order on a surface of the substrate. The thin film transistors of the TFT array may be arranged in a side by side manner or may be arranged with gaps in between the individual thin film transistors. By way of example, the TFT array may be provided as an array of passive or active pixels which store charge for read out by electronics. The TFT array is typically disposed on an active layer formed of amorphous silicon or an amorphous metal oxide, or organic semiconductors. Suitable amorphous metal oxides include zinc oxide, zinc tin oxide, indium oxides, indium zinc oxides (In—Zn—O series), indium gallium oxides, gallium zinc oxides, indium silicon zinc oxides, and indium gallium zinc oxides (IGZO). IGZO materials include $InGaZnO_4$ and $InGaO_3(ZnO)_m$, where m is <6. Suitable organic semiconductors include, but are not limited to, conjugated aromatic materials, such as rubrene, tetracene, pentacene, perylene-diimides, tetracyanoquinodimethane and polymeric materials such as polythiophenes, polybenzodithiophenes, polyfluorene, polydiacetylene, poly(2,5-thiophenylene vinylene) and poly(p-phenylene vinylene) and derivatives thereof. Each pixel contains a patterned second electrode.

Visible light impinging on the photodiode layer (such as from the scintillator layer discussed below) partially discharges capacitance of the diodes of the photodiode layer. The amount of photodiode discharge is proportional to the quantity of the incident light. Each pixel of the TFT array incorporates a switching field effect transistor (FET) used to control when charge is restored to the photodiode capacitance. The charge required to restore the capacitance is provided and measured by external charge measurement circuitry. This circuitry, coupled with the TFT array, allows sequential scanning and readout of all photodiodes in the array. A custom A/D integrator/converter is normally used to measure the charge required to restore the photodiode to its initial un-discharged state. The magnitude of the discharge is proportional to the incident X-ray dose at each pixel integrated by both the scintillator layer and the photodiode layer during the length of the X-ray exposure. The final X-ray image is reconstructed pixel-by-pixel using the photodiode layer discharge levels to set the image pixel intensity.

The scintillator may be formed or positioned over the cathode of the photodiodes, and the environmental cover may cover the scintillator. In operation, the scintillator is excited by incident X-rays and produces visible light in response. The scintillator layer may be a monolithic scintillator or pixelated scintillator array. Gadolinium oxy-sulfide (GOS ($Gd_2O_2S$)) is one possible scintillator material, which is in the form of thin film with millimeter range thickness. Cesium iodide (CsI) is another scintillator material that can be used for a high sensitivity scintillator, and may be deposited by thermal evaporation. Another scintillator that may be used is a PIB (particle in binder) scintillator, where scintillating particles may be incorporated in a binder matrix material and flattened on a substrate. The visible light generated by the scintillator irradiates the photodiode layer disposed on the TFT array.

Figure 3:
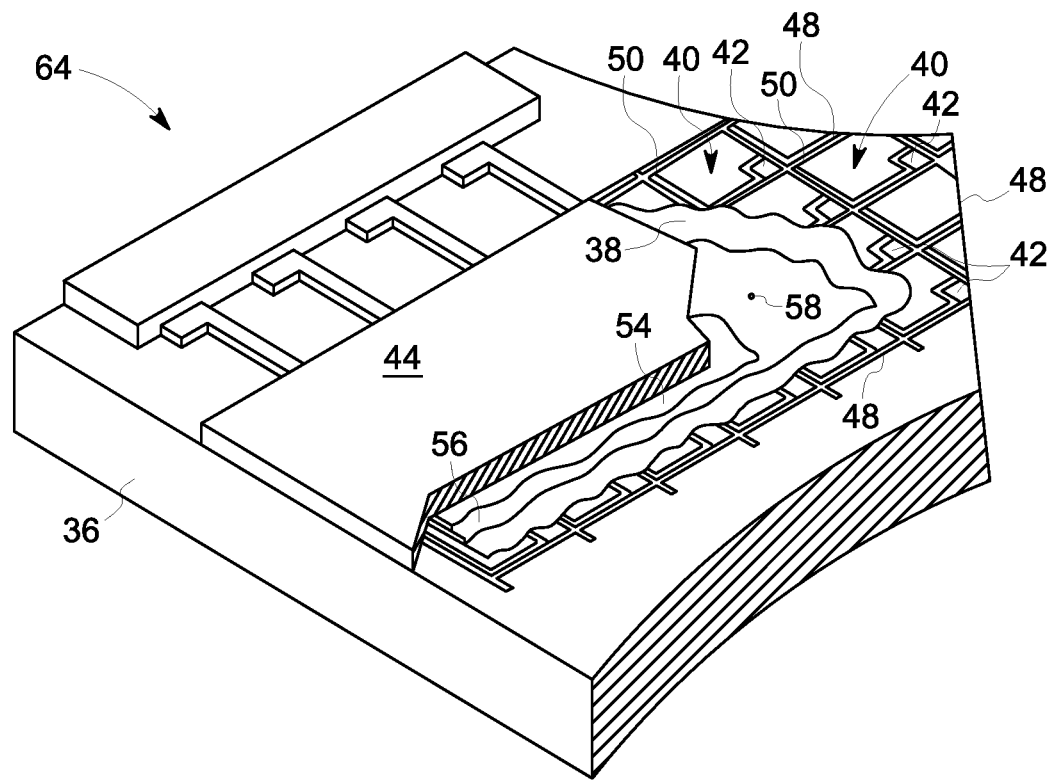
FIG. 3 is a perspective cut-away view of a physical arrangement of the components of an implementation of a scintillation-based imaging detector, in accordance with an example embodiment of the present disclosure.

With the preceding composition and component discussion in mind, FIG. 3 depicts the physical and spatial arrangement of certain of these components in a perspective cut-away view. In particular, FIG. 3, depicts layers of a scintillator-based detector panel 64 that may be housed within an X-ray sensor 22. Though depicted as flat in FIG. 3, the detector panel 64 is formed on a flexible substrate 36 that can be formed to various curvatures (in one-dimension or in two dimensions) and upon which one or more components can be deposited. For example, in the present embodiment, detector panel 64 can include a continuous photosensor element 38, transistors 42 (e.g., amorphous silicon (a-Si) thin-film transistors (TFTs)), scintillator 44, data readout lines 48, scan lines 50, a conductive layer 54, and a dielectric layer 56 deposited with respect to substrate 36.

As generally discussed herein, the components of detector panel 64 can be composed of metallic, dielectric, organic, and/or inorganic materials, and can be fabricated with respect to substrate 36 using various material deposition and removal techniques. Some examples of suitable deposition techniques include, but are not limited to, chemical vapor deposition, physical vapor deposition, electrochemical deposition, stamping, printing, sputtering, slot die coating, and/or any other suitable deposition technique. Some examples of material removal techniques include lithography, etching (e.g., dry, wet, laser), sputtering, and/or any other suitable material removal techniques.

The detector panel 64 can include an array of pixel areas 40 on the flexible substrate 36. Each of pixel areas 40 can include transistors 42 (e.g., provided as a TFT array) operatively coupled to respective data readout lines 48, scan lines 50, and photosensor 38. In the depicted embodiment, transistors 42 are arranged in a two-dimensional array having rows extending along a first dimension and columns extending along a second, perpendicular dimension. In some embodiments, transistors 42 can be arranged in other configurations. For example, in some embodiments, transistors 42 can be arranged in a honeycomb pattern. A spatial density of transistors 42 can determine a quantity of pixel areas 40 or pixels in the array, the physical dimensions of the array, as well as the pixel density or resolution of detector panel 64.

Each of data readout lines 48 can be in electrical communication with an output of a respective transistor 42. For example, each of data readout lines 48 can be associated with a row or column of transistors 42, and the output (e.g., source or drain) of each transistor 42 in the row or column can be in electrical communication with the same data readout line 48 such that there is one data readout line per row or column. Data readout lines 48 are susceptible to interference, such as electronic noise from a surrounding environment, which can affect data signals being transmitted on data readout lines 48. Data readout lines 48 can be formed of a conductive material, such as a metal, and can be configured to facilitate transmission of electrical signals, corresponding to incident X-rays, to image processing circuitry (e.g., image processing circuit 30).

Scan lines 50 can be in electrical communication with inputs (e.g., gates) of transistors 42. For example, each of scan lines 50 can be associated with a row or column of transistors 42 and the input of each of transistors 42 in the same row or column can be in electrical communication with one of scan lines 50. Electrical signals transmitted on scan lines 50 can be used to control transistors 42 to output data on the transistor's output such that each transistor 42 connected to one of scans lines 50 are configured to output data concurrently and data from each transistor 42 connected to one of scan lines 50 flows through data readout lines 48 in parallel. In various embodiments, scan lines 50 and data readout lines 48 can extend perpendicularly to one another to form a grid. Scan lines 50 can be formed of a conductive material, such as a metal, and can be configured to facilitate transmission of electrical signals from a controller (e.g., system controller 28) to an input of transistors 42.

Continuous photosensor 38 can be deposited over transistors 42, data readout lines 48, and/or scan lines 50. Photosensor 38 can be formed from one or more photoelectric materials, such as one or more organic (i.e., carbon-based) and/or inorganic (i.e., non-carbon-based) materials that that convert light into electric current. In the present embodiment, the photoelectric material can extend continuously as a unitary structure over the array of transistors 42, data readout lines 48, and scan lines 50 such that the photoelectric material of photosensor 38 substantially overlays and/or covers pixel areas 40. By using a continuous unpatterned photoelectric material that is disposed over the transistor array, the density of transistors 42 in the array, and therefore, the pixel density of the imaging detector, can be increased as compared to patterned photosensors and/or a complexity of imaging detector fabrication can be reduced.

Electrodes (e.g., electrical contacts) of photosensor 38 can define anode(s) and cathode(s) of photosensor 38 and can be formed of a conductive material, such as, for example, indium tin oxide (ITO). For example, photosensor 38 can include electrodes disposed on a first side of photosensor 38 for electrically coupling the first side of photosensor 38 to transistors 42 and can include one or more electrodes disposed on a second opposing side of photosensor 38 for electrically coupling the second side of photosensor 38 to a bias voltage or vice versa. The electrodes of photosensor 38 can form the anode(s) or cathode(s) of photosensor 38.

A dielectric layer 56 can be disposed over continuous photosensor 38 and a conductive layer 54 can be disposed on dielectric layer 56. Dielectric layer 56 can include vias 58 to electrically couple conductive layer 54 to the electrode(s) of photosensor 38 to allow a common bias voltage to be applied at each pixel area 40 of detector panel 64.

Scintillator 44 is disposed over conductive layer 54 and generates the optical photons when exposed to X-rays. The optical photons emitted by scintillator 44 are detected by photosensor 38, which converts the optical photons to an electrical charge that can be output through transistors 42 to data readout lines 48.

Figure 4:
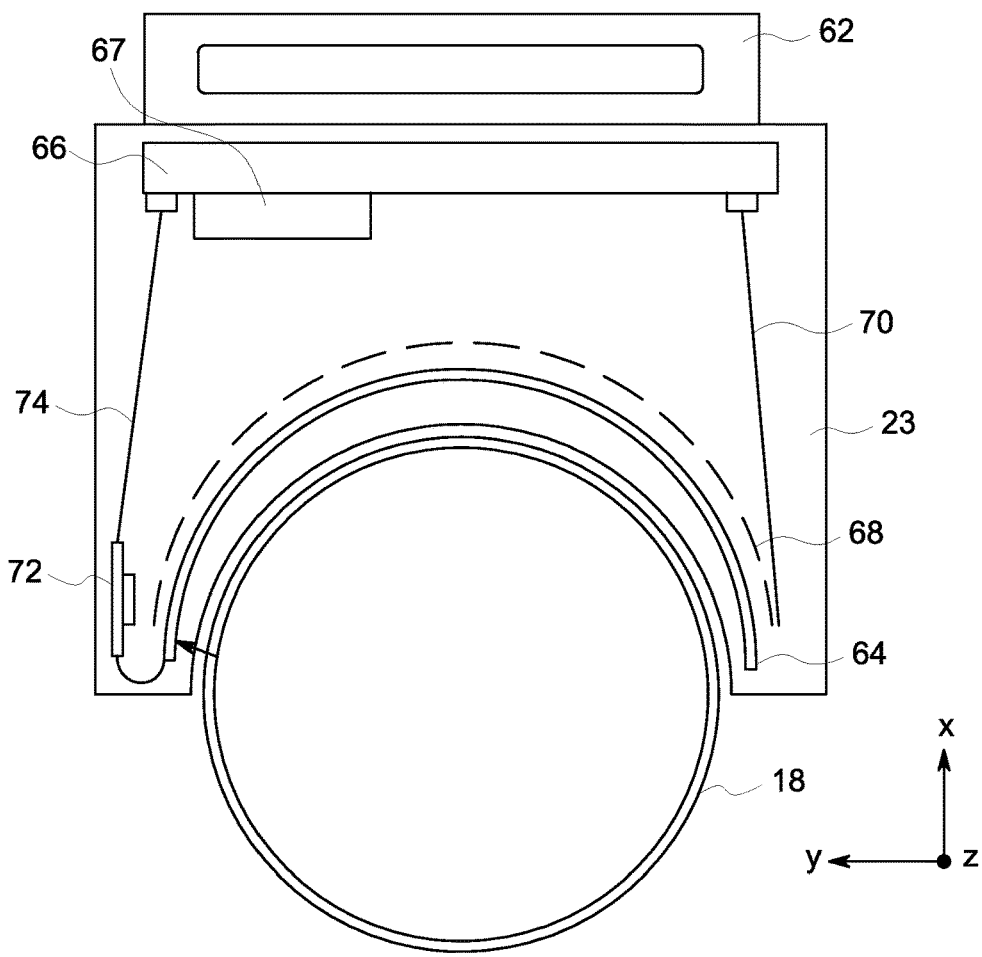
FIG. 4 depicts a cross-section of one embodiment of a curved detector panel, in accordance with an example embodiment of the present disclosure.

With the preceding discussion of detector components, arrangement, and operation in mind, FIG. 4 depicts a cross-section of one embodiment of a curved detector panel 64 fabricated using a thin, flexible glass substrate 36 and suitable for use in an X-ray sensor 22 as discussed herein. In the depicted example, the detector panel 64 built using the thin, flexible glass substrate 36 is suitable for inspection of pipes 18 and pipe welds and may be built into, or removably inserted into, a portable case or housing 23 for movement to and from an inspection site. With this in mind, the portable housing 23 may include a handle 62, pipe attachment features, sensor attachment features, or other features to facilitate moving the X-ray sensor 22 to and from an inspection site and use of the X-ray sensor 22 for image acquisition.

Acquisition and processing circuitry 66 (which may be embodied as a motherboard or one or more other circuit boards) may be provided in communication with the detector panel 64 within the housing 23 and may incorporate or provide the functionality described with respect, one or more of power supply and control circuit 24, system controller 28, detector acquisition circuit 26, and/or image processing circuit 30. By way of example, the circuitry provided on the circuit board(s) 66 may perform operations related to the acquisition and processing of digital signals from the panel 64. A power supply 67 is also provided in the depicted example, and may take the form of one or more batteries or a connector for connecting external power. In embodiments where the X-ray sensor 22 is removable or swappable with respect to a given housing 23, the circuit board(s) 66 may remain in the housing 23 while different sensors 22 are swapped into and out of the housing 23.

In the depicted example, the curved X-ray sensor 22 and detector panel 64 are shown in cross-section and fitted to or proximate to a pipe 18 for inspection. In this view, a series of scan modules 68 are shown running along the curvature (shown in the x,y, plane of the figure) of the panel 64. The scan modules 68 are configured to connect to and to operate the scan lines 50 of the panel 22. The scan modules 68 in turn are connected to the acquisition circuitry of the circuit board(s) 66 via one or more scan extension connectors 70.

Similarly, a series of data modules 72 are shown running along the length of the pipe 18 (i.e., along the z-axis of the figure) within the panel 22. The data modules 72 are configured to connect to and to operate the data readout lines 48 of the panel 64. The data modules 72 in turn are connected to acquisition circuitry of the circuit board(s) 66 via one or more data extension connectors 74.

Figure 5:
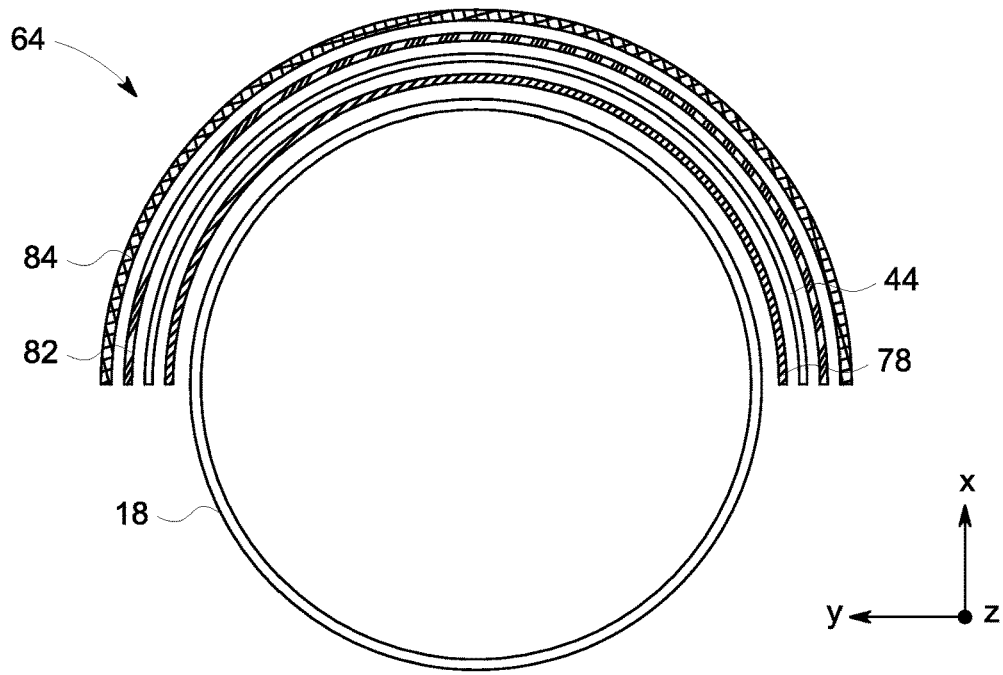
FIG. 5 depicts a schematic cross-section of an embodiment of a detector panel, in accordance with an example embodiment of the present disclosure.

Turning to FIG. 5, a schematic cross-section of an embodiment of a detector panel 64 of FIG. 4 is shown to better illustrate the various layers (discussed above) of the panel 64 in relation to the object (e.g., pipe 18) undergoing imaging. As shown in FIG. 5, a protective, environmental cover 78 is the closest layer to the pipe 18. The next layer outward from the pipe is the scintillator 44, which interacts with incident X-rays to generate optical photons detected at the next layer. The next layer outward from the pipe 18 in the depicted example includes the substrate 36, photodiodes (i.e., photosensor elements 38), and TFT (i.e., transistors 42), which are shown jointly as light sensing layer 82. Thus, in the depicted example, layer 82 provides the photosensing and readout functionality, as well as the flexible substrate underlying the photodetection and readout components. Lastly, the next layer outward from the pipe 18 is the support or backing layer 84, typically a curved, rugged material, such as a suitable plastic material to which the substrate 36 may be adhesively mounted during fabrication.

In one implementation, the process for fabrication involves three steps: (1) fabrication of the TFT/photodiode array on a thick glass substrate, (2) thinning the glass using mechanical lapping and polish, and (3) inserting the substrate into a curved support fixture.

With respect to the first step, the TFT/photodiode array may be fabricated using standard photolithographic techniques. In one fabrication example, the array includes passive pixel architecture with a thin-film transistor for charge storage, and photodiode for conversion and storage of scintillator light. Following the deposition of the TFT and photodiode layers, a protective barrier silicon nitride film may be deposited to protect the array from environmental or physical damage. The completed TFT/photodiode array component may be referred to as a light imager panel. The completed light imager glass sheet, in one example, was 36 cm×37 cm.

In this example, after the light imager was completed, the glass was mechanically scribed to an intermediate size (e.g., 25.4 cm×30.48 cm) to fit into commercial thinning machines. In one embodiment, the light imager was mounted on a thick glass plate using wax for holding, with the active surface facing to the mounting plate. Then a lapping and polishing process was used to thin the glass to 0.2 mm thickness. Following polishing, the plate glass was heated to release the thinned light imager. The mounting wax was rinsed from the glass surface using a wax remover (OptiClear, National Diagnostics). Following glass thinning, the light imager was mechanically scribed to final size of 22.61 cm×22.61 cm (TLC Phoenix-600 Glass scriber). In other embodiments, thinning of the glass can be achieved by chemical etching and the scribing performed with a laser process.

The back side of the light imager was laminated (Sun-Tek R2S-12S-V-C or similar) using a pressure sensitive adhesive (8171CL 3M™ or similar) to a plastic sheet (McMaster-Carr Part #1451T11 Flame-Retardant Polypropylene Film, 0.017" thick) in order to provide a mechanical support for the thin glass substrate. Scan drive and data readout ASIC modules were bonded to the light imager using conventional processing and conductive adhesive materials.

Figure 6A:
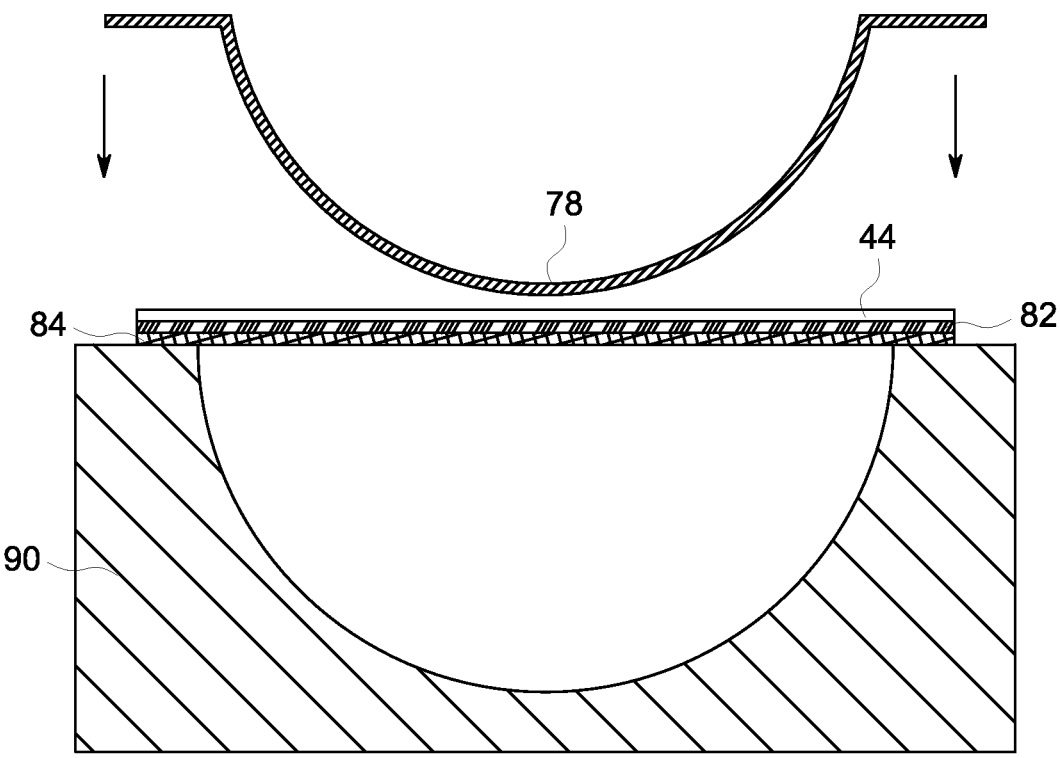
FIGS. 6A and 6B jointly illustrate an example of the formation of a curved light imager panel, in accordance with an example embodiment of the present disclosure.
Figure 6B:
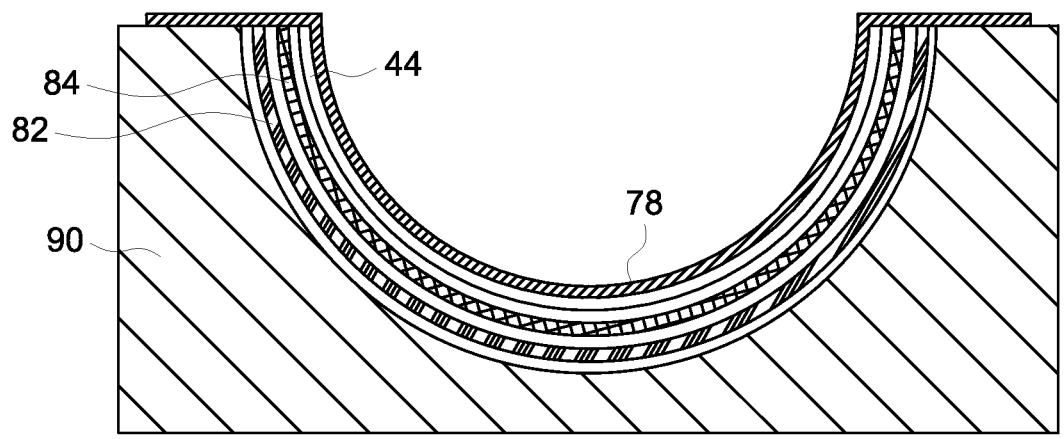

Next, the light imager is curved into its final configuration, as shown in FIGS. 6A and 6B. In this example, the light imager with electronics (shown as layer 82, e.g., the substrate 36, TFT array, and photodiode layers) is placed onto a curved fixture 90 having the desired shape, size, and curvature of the detector panel 22 being fabricated. A GOS scintillator screen 44 (e.g., a Mitsubishi KYOKKO DRZ-STD) is placed onto the surface of the front side of the light imager 82. A rigid plastic or carbon graphite retainer (e.g., environmental cover 78 having a generally complementary fit to the curved fixture 90) is placed on top of the scintillator screen 44. The light imager 82 is bent into the final radius of curvature by pressing the rigid retainer 78 into the curved fixture 90, at a suitable rate (e.g., approximately 1 mm/minute). Screws may be used to fasten the retainer (e.g., cover 78) to the curved fixture 90 with spacers to maintain the desired thickness. Electronic modules are plugged into the readout system for readout testing. Modeling and experiments suggest that thin glass of 0.2 mm thickness may be bent to a diameter of 4" ROC. It should be appreciated that, while FIGS. 6A and 6B depicts a step in the fabrication of a concave curved detector panel 64, in certain embodiments, such as where the detector panel 64 will be used in a sensor 22 deployed internal to a pipe 18, the detector panel 64 may be formed to have the opposite curvature, i.e., a convex curvature. In such embodiments, the convex curvature of the detector panel 64 may be achieved by using a convex curved fixture 90 and a cover 78 curved to complement the curvature of the fixture.

Figure 7:
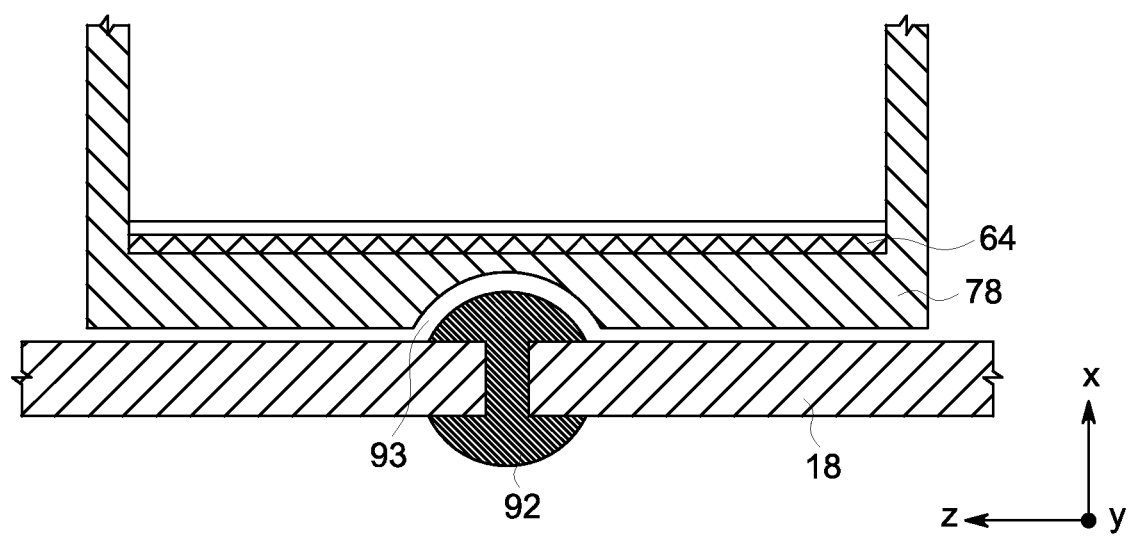
FIG. 7 depicts a cross-section of a pipe and X-ray sensor across a weld fillet, in accordance with an example embodiment of the present disclosure.

While the preceding describes the overall generation of a curved detector panel 64 and related X-ray sensor 22, it should be appreciated that, in addition to the overall curvature of the sensor 22 and panel 64 to conform to an interior or exterior curvature of a pipe 18, other conforming features may be provided as part of the sensor 22. For example, and turning to FIG. 7, in a weld inspection embodiment, the weld fillet 92 may protrude from the surface of the joined pipes 18. It should be appreciated that such a surface feature may be accommodated by the X-ray sensor 22 in a variety of ways. For example, in one embodiment, the conforming surface of the X-ray sensor 22, such as the environmental cover 78, may be formed with a notch or groove 93 to accommodate the fillet 92. In such an embodiment, the substrate 36 and the associated detector panel 22 may remain curved in only one-dimension, i.e., to accommodate the pipe curvature, with accommodation for the fillet 92 being accomplished in the cover alone. Conversely, in embodiments where the substrate 36 is sufficiently flexible in two-dimensions (such as in embodiments employing a plastic substrate 36) the substrate 36 (and detector panel 64) may also be curved in the second dimension to accommodate the surface feature (e.g., fillet 92) of the pipe 18. Similarly, in other embodiments, grooves, notches, or additional two-dimensional curvature may be provided in the cover 78 or cover and detector panel 64 of the X-ray sensor 22 to accommodate flanges, bolts, nuts, or other protrusions from the pipe 18. Similarly, cutout regions or bends may be provided to accommodate pipe elbows or connections or bends within the pipe 18.

Figure 8:
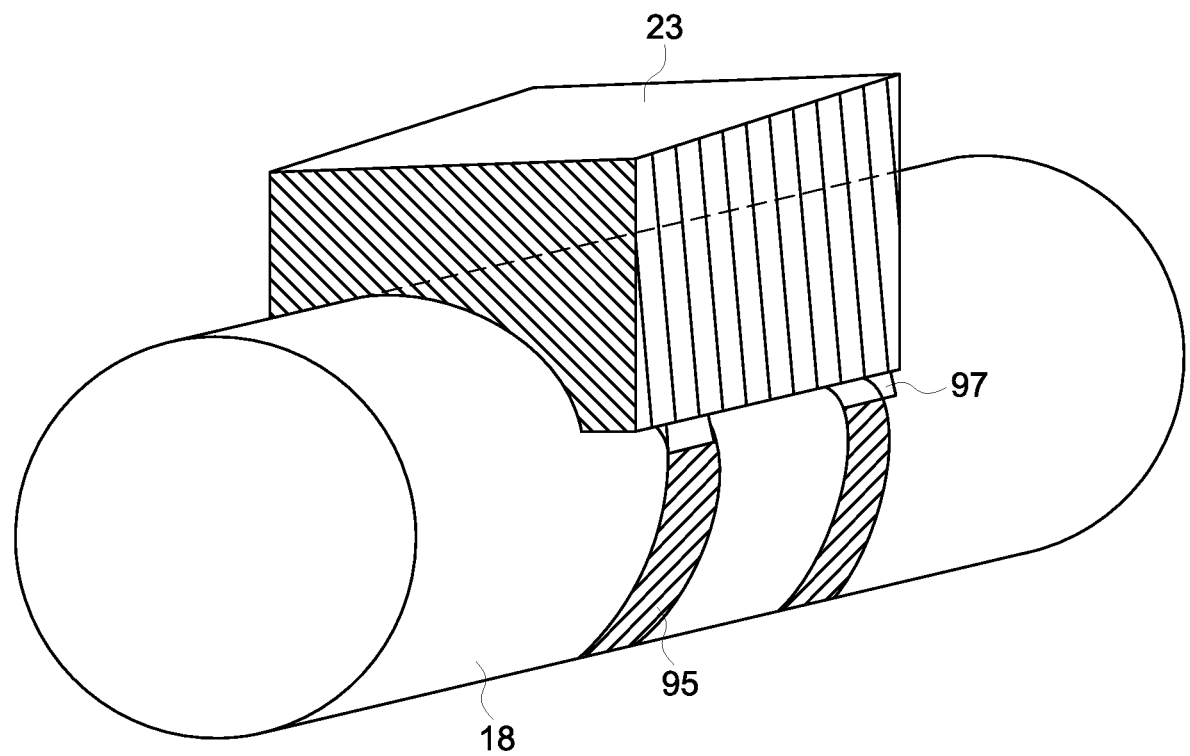
FIG. 8 depicts attachment of an X-ray sensor to a pipe, in accordance with an example embodiment of the present disclosure.

With respect to the attachment of the X-ray sensor 22 to the external surface of a pipe 18, FIG. 8 depicts one example of a suitable attachment mechanism. In this example, mounting straps 95 attach to loops 97 connected to the housing 23 housing the sensor 22. The straps 95 extending around the pipe 18 at the inspection site on the pipe 18, holding the sensor 22 in place. While the use of straps 95 is one possible attachment mechanism, other suitable attachments include, but are not limited to: bungee or elastic cords extending around the pipe 18 to hold the X-ray sensor in place, magnets configures to hold the X-ray sensor to a magnetic surface, adhesives having bonding strength and set times suitable for affixing and removing the X-ray sensor 22 to a pipe 18, snaps or other mechanical couplings, complementary hook-and-loop fasteners, and so forth. In this manner, the X-ray sensor 22 may be held in place relative to the pipe 18 while X-ray transmission data is acquired, without a user needing to remain in place during the imaging operation.

Figure 9:
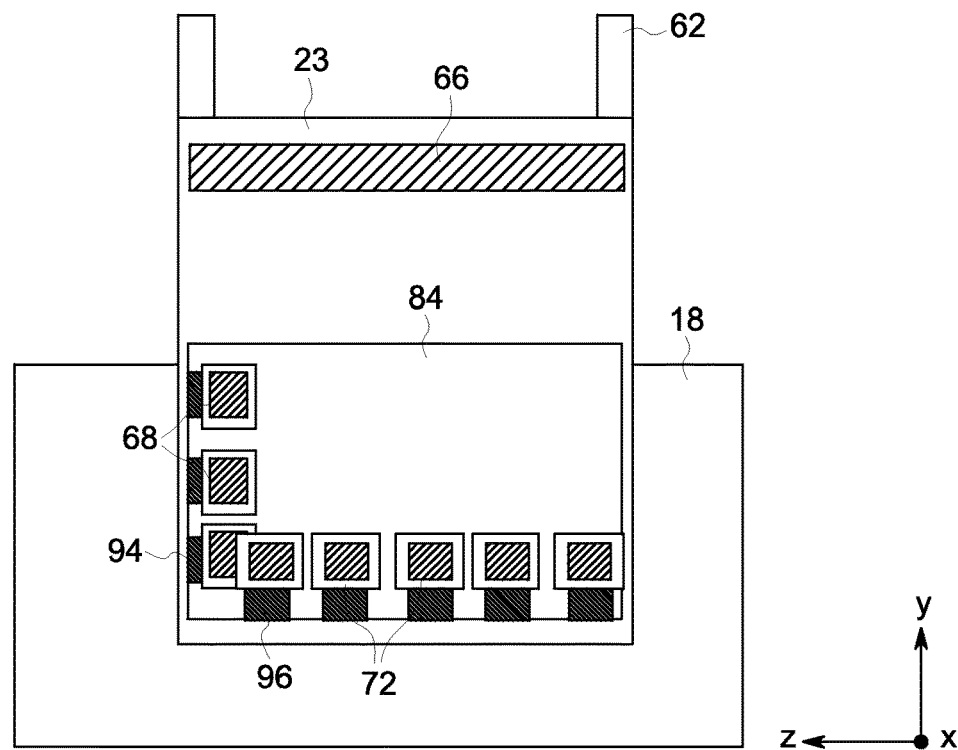
FIG. 9 depicts a wrapped configuration of scan modules, in accordance with an example embodiment of the present disclosure.
Figure 10:
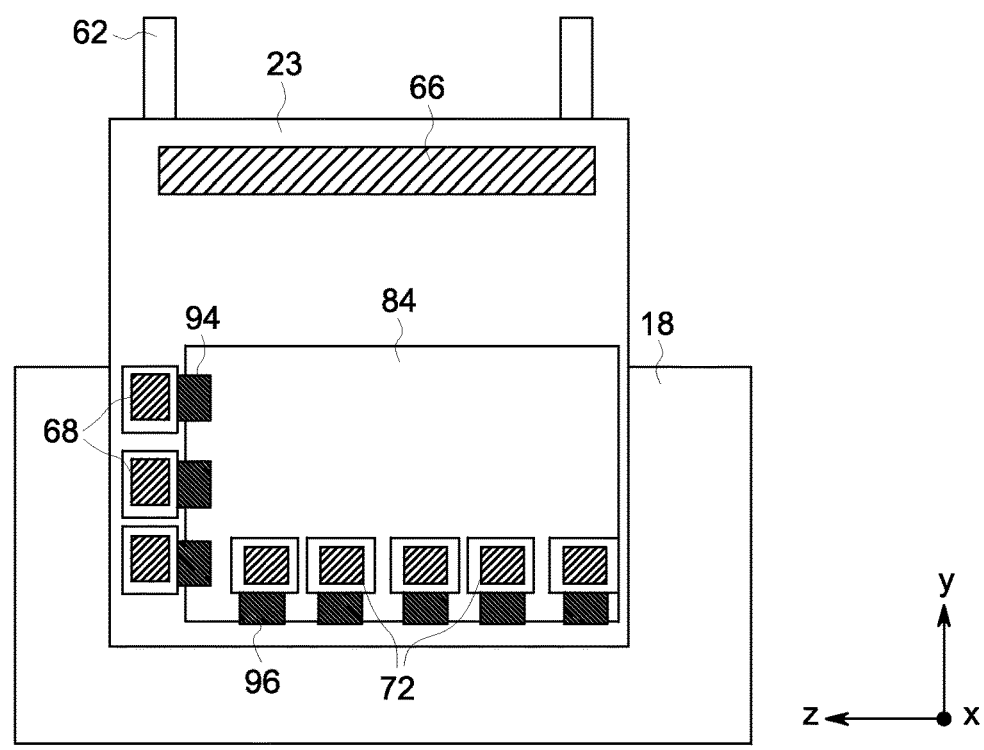
FIG. 10 depicts an unwrapped configuration of scan modules, in accordance with an example embodiment of the present disclosure.

With the preceding in mind, and turning to FIGS. 9 and 10, two different configurations of positioning the scan modules 68 relative to the detector panel 64 (the backing 84 of which is shown in FIGS. 9 and 10) are depicted. In the embodiment shown in FIG. 9, the scan modules 68 are electrically connected to the panel components via scan flex circuits 94. Similarly, the data modules 72 are electrically connected to the panel components via data flex circuits 96. In FIG. 9, the scan modules 68 are shown in a wrapped configuration relative to the backing 84, i.e., the scan modules 68 are wrapped around the backing 84, thus providing greater detector area to be provided in the z-dimension (i.e., in the direction the pipe 18 is running), however at the expense of greater vertical complexity with respect to the layer arrangement and increased bending of the scan flex circuits 94. Conversely, in FIG. 10 an unwrapped arrangement of the scan modules 68 is shown, with the modules 68 disposed to the side of the panel 64 instead of wrapped behind the panel. Such an unwrapped arrangement may sacrifice usable detector surface area in the z-dimension, but may be less complex. For the various examples provided below, scan modules may be wrapped or unwrapped, depending on whether usable detector surface area is need up to the edge of the holder 23. Due to the data modules 72 being placed in the z-dimension, and thus along an edge of the panel where it will typically be desirable to acquire image data, the data modules 72 will typically be wrapped around the back of the panel 64 (i.e., behind backing 84. However, though the present embodiments generally describe scenarios in which the data modules 72 run in the z-dimension and the scan modules 68 are situated in the x,y plane, in other implementations this may be reversed, in which case the scan modules 68 will typically be wrapped along the z-edge and the data modules may be wrapped or unwrapped.

With the preceding in mind, FIGS. 11-15 depict various embodiments of configuring data modules 72 and scan modules 68 with respect to an active array of a detector panel. In these examples, standard TFT array gate drive modules and TFT array data acquisition modules are assumed, having 256 channels and being ~5 cm or 2" wide. Scan and data modules may be rigid PCB type or Chip-on-Flex. In these examples bonding along detector length, which will be curved, is eliminated or minimized. Similarly, lithography patterns are kept simple and symmetric to simplify fabrication and configuration. In these example, when scan modules 68 are in an unwrapped configuration, approximately 2" (i.e., ~5 cm) of glass substrate is occupied by the scan modules 68. Among other considerations that vary with respect to the examples shown in FIGS. 11-15 is the layout density of the scan line connection matrix lines, with greater density being associated with greater complexity of design.

Figure 11:
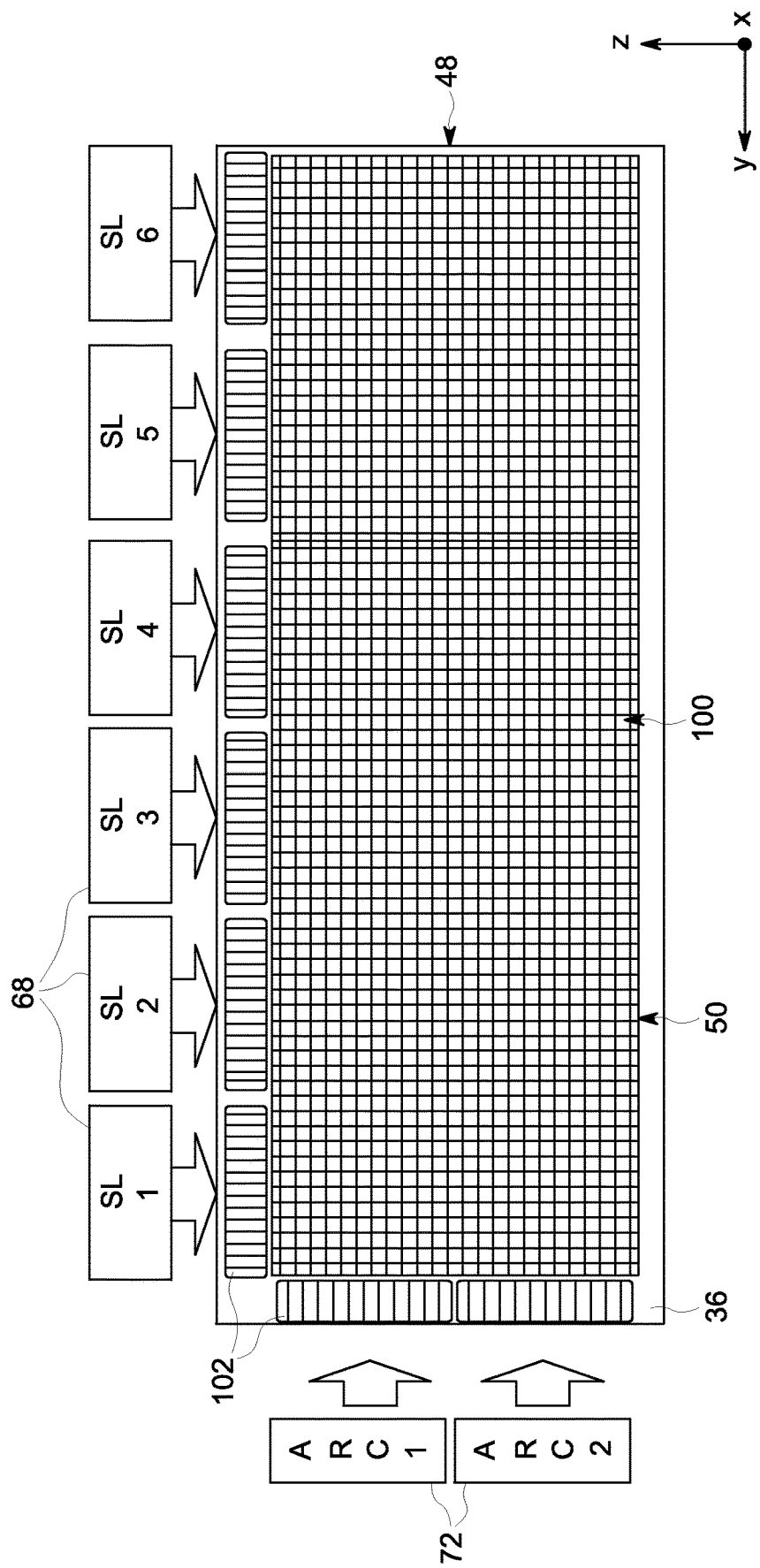
FIG. 11 depicts a first example of an arrangement of an active array, scan modules, and data modules, in accordance with an embodiment of the present disclosure.

Turning to FIG. 11, in the first example an active image array having 200 µm pitch pixels is provided such that the active array is approximately 4" by 11.8" (~10.2 cm by ~30 cm). The active array 100 is readout using 512 data lines 48 and 1,536 scan lines 50 such that two data modules 72 and six scan modules 68 are employed, respectively. Scan modules 68 and data modules 72 are respectively connected to the respective scan and data lines 50, 48 at connectors 102, which may be any suitable electrical connection for connecting to the modules. In the depicted example, the data modules 72 are bonded to connectors 102 which run along an uncurved edge of the panel (i.e., in the z-direction). Conversely, the scan modules 68, in the depicted example, run along the curved edge of the detector panel, when formed, and thus the bonds between the scan modules 68 and corresponding connectors 102 must accommodate the curvature of the panel in the x,y plane. In the depicted example, there is no "fan out" of connector lines for either the scan or data lines as the scan and data modules engage linearly and directly with the respective scan and data lines they service.

One aspect of the embodiment shown in FIG. 11 that should be noted is that the active area 100 along the rightmost and bottom edges extends substantially to the edge of the panel, allowing image data to be acquired up to those edges. Such a configuration may be useful in implementations where image data needs to be acquired next to a pipe joint or other spatially limited context, where the geometry of the object being imaged imposes spatial constraints. It should also be noted that, in a wrapped configuration (as shown in FIG. 9), it may be possible to acquire image data closer to the edges of the detector panel to the extent that the modules 68, 72 are wrapped around the back of the substrate 36.

Figure 12:
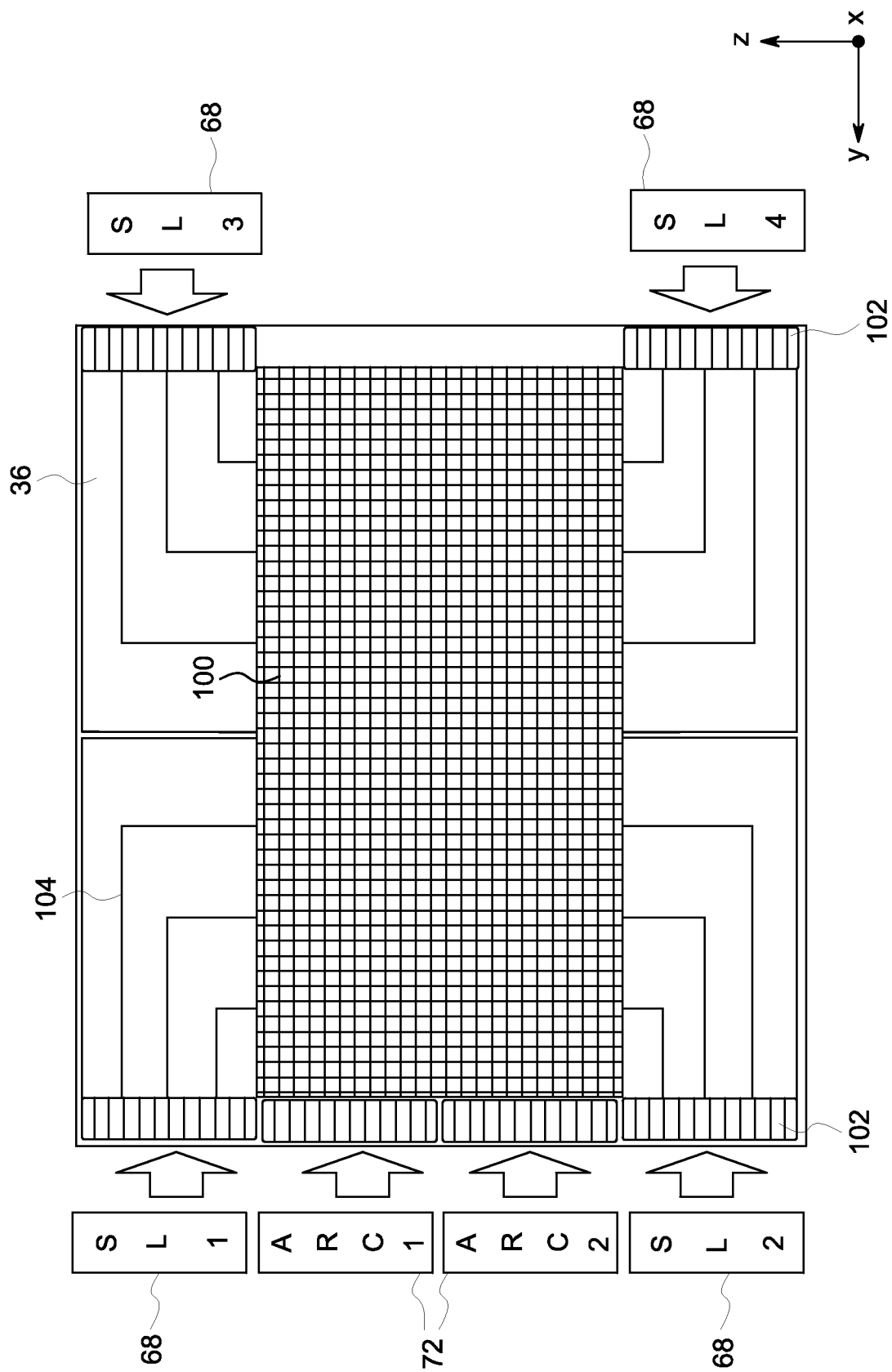
FIG. 12 depicts a second example of an arrangement of an active array, scan modules, and data modules, in accordance with an embodiment of the present disclosure.

Turning to FIG. 12, another embodiment is shown. In this example an active image array 100 having 200 µm pitch pixels is provided, with the active array 100 being approximately 4" by 8" (~10.2 cm by ~20 cm). In the depicted example, the substrate 36 on which the active array 100 is formed is approximately 9" by 8" (~22.9 cm by ~20 cm). The active array 100 is readout using 508 data lines and 1,016 scan lines such that two data modules 72 and four scan modules 68 are employed, respectively. Scan modules 68 and data modules 72 are respectively connected to the respective scan and data lines 50, 48 at connectors 102. In the depicted example, the data modules 72 and scan modules 68 are bonded to connectors 102 which run along an uncurved edge of the panel (i.e., in the z-direction), with the scan lines 50 being electrically connected to the respective connectors 102 by connection lines 104. In this manner, no modules 68 need be connected along the curved edge of the detector panel. As will be appreciated, placement of the scan modules 68 along the uncurved edges (i.e., along the z-axis) limits the ability the extent to which the active array 100 may approach the edges of the panel, as connection lines 104 are run along the edges in the z-dimension to reach the "side-mounted" scan modules 68.

Figure 13:
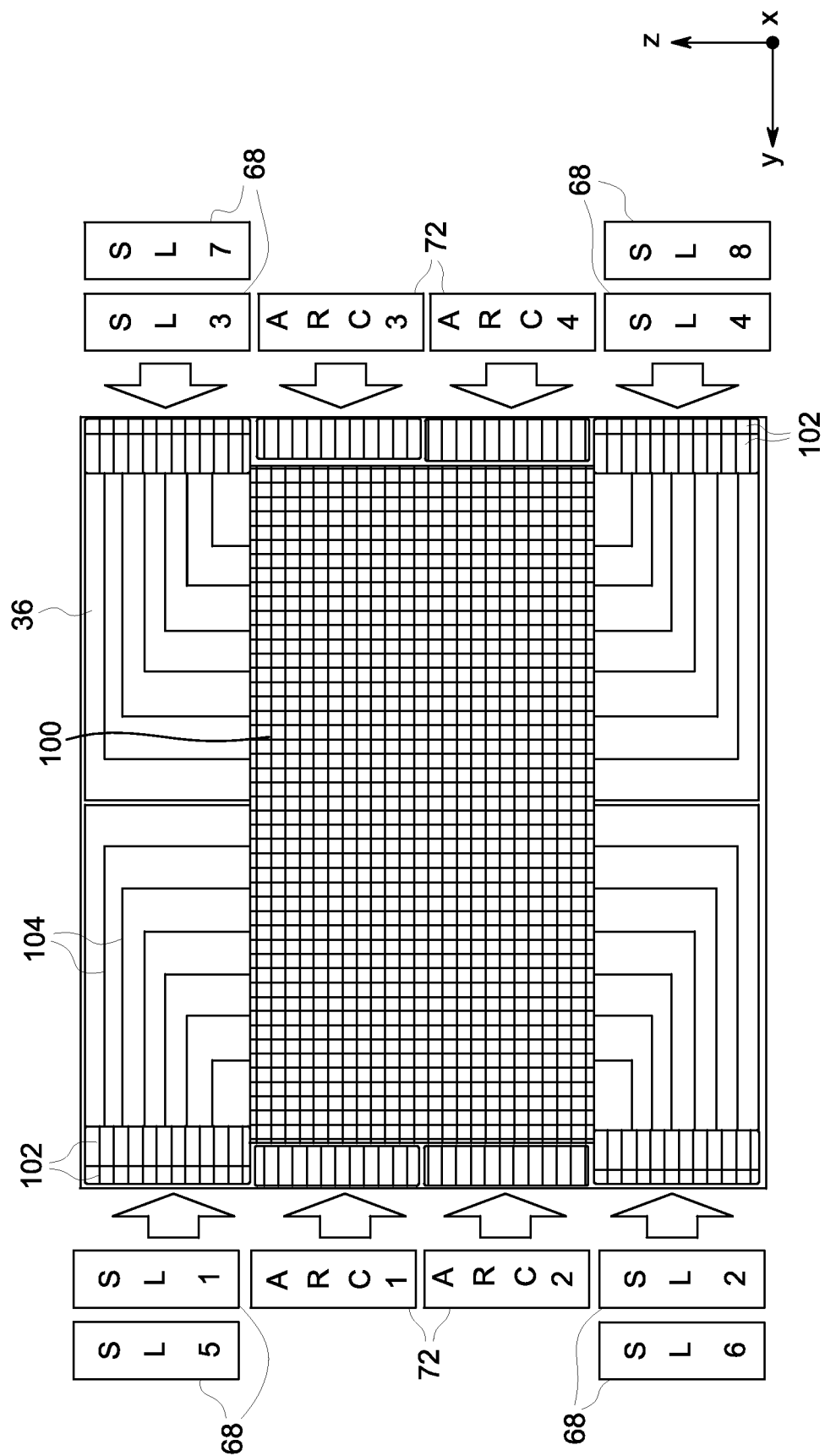
FIG. 13 depicts a third example of an arrangement of an active array, scan modules, and data modules, in accordance with an embodiment of the present disclosure.

In FIG. 13, a variation of the configuration shown in FIG. 12 is depicted in which the connection lines 104 and connectors 102 connecting to the scan modules 68 are provided in a tiered or layer manner to allow a greater density of connections. In the depicted example, an active image array 100 having 100 µm pitch pixels (compared to the 200 µm pitch pixels in the preceding examples) is provided, with the active array 100 being approximately 4" by 8" (~10.2 cm by ~20 cm). In the depicted example, the substrate 36 on which the active array 100 is formed is approximately 9" by 8" (~22.9 cm by ~20 cm). The active array 100 is readout using 1,016 data lines and 2,032 scan lines such that four data modules 72 and eight scan modules 68 are employed, respectively, with the scan modules 68 being vertically stacked or tiered to fit within the limited space. Scan modules 68 and data modules 72 are respectively connected to the respective scan and data lines 50, 48 at connectors 102, with the connectors 102 serving the scan modules being tiered such that connections for one tiered connector are above the other. As will be appreciated, a detector panel having greater resolution is provided in a comparable space envelope to what was seen in the preceding example, though with sufficiently greater thickness to accommodate the stacked scan modules 68.

In the depicted example, the data modules 72 and scan modules 68 are bonded to connectors 102 which run along an uncurved edge of the panel (i.e., in the z-direction), with the scan lines 50 being electrically connected to the respective connectors 102 by connection lines 104. In this manner, no modules 68 need be connected along the curved edge of the detector panel. As will be appreciated, placement of the scan modules 68 along the uncurved edges (i.e., along the z-axis) limits the ability the extent to which the active array 100 may approach the edges of the panel, as connection lines 104 are run along the edges in the z-dimension to reach the "side-mounted" scan modules 68.

Figure 14:
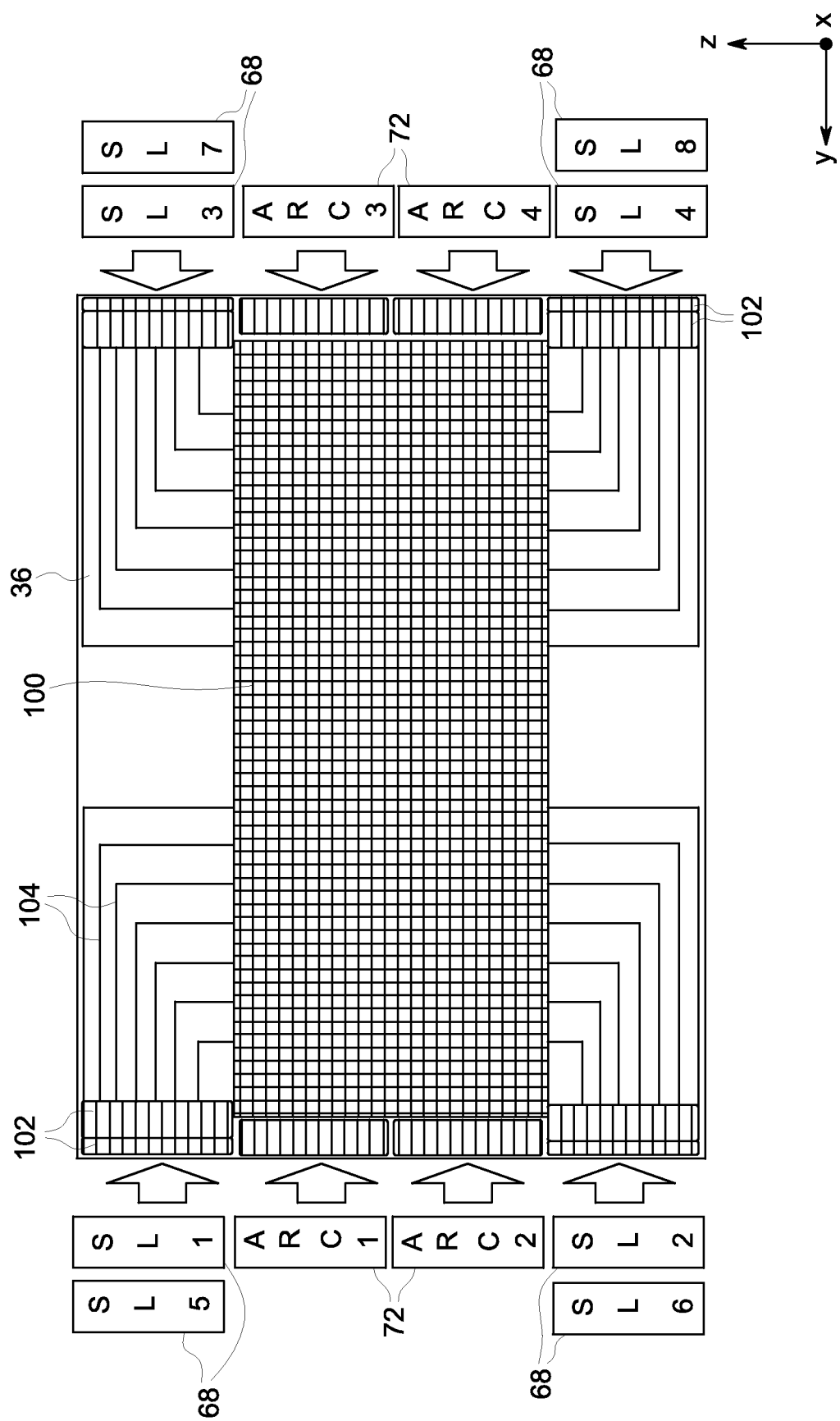
FIG. 14 depicts a fourth example of an arrangement of an active array, scan modules, and data modules, in accordance with an embodiment of the present disclosure.

FIG. 14 depicts an arrangement similar to that of FIG. 13, but of different dimensions. In this example an active image array 100 having 125 μm pitch pixels (compared to the 200 μm and 100 μm pitch pixels in the preceding examples) is provided, with the active array 100 being approximately 4-5" by 10" (~10.2-12.7 cm by ~25.4 cm). In the depicted example, the substrate 36 on which the active array 100 is formed is approximately 11" by 8-9" (~28 cm by ~20.3-22.9 cm). The active array 100 is readout using 814-1,016 data lines and 2,032 scan lines such that four data modules 72 and eight scan modules 68 are employed, respectively, with the scan modules 68 being vertically stacked or tiered to fit within the limited space as in FIG. 13. Scan modules 68 and data modules 72 are respectively connected to the respective scan and data lines 50, 48 at connectors 102, with the connectors 102 serving the scan modules being tiered such that connections for one tiered connector are above the other. As in the preceding example, the data modules 72 and scan modules 68 are bonded to connectors 102 which run along an uncurved edge of the panel (i.e., in the z-direction), with the scan lines 50 being electrically connected to the respective connectors 102 by connection lines 104 which are formed so as to reach the "side-mounted" scan modules 68.

Figure 15:
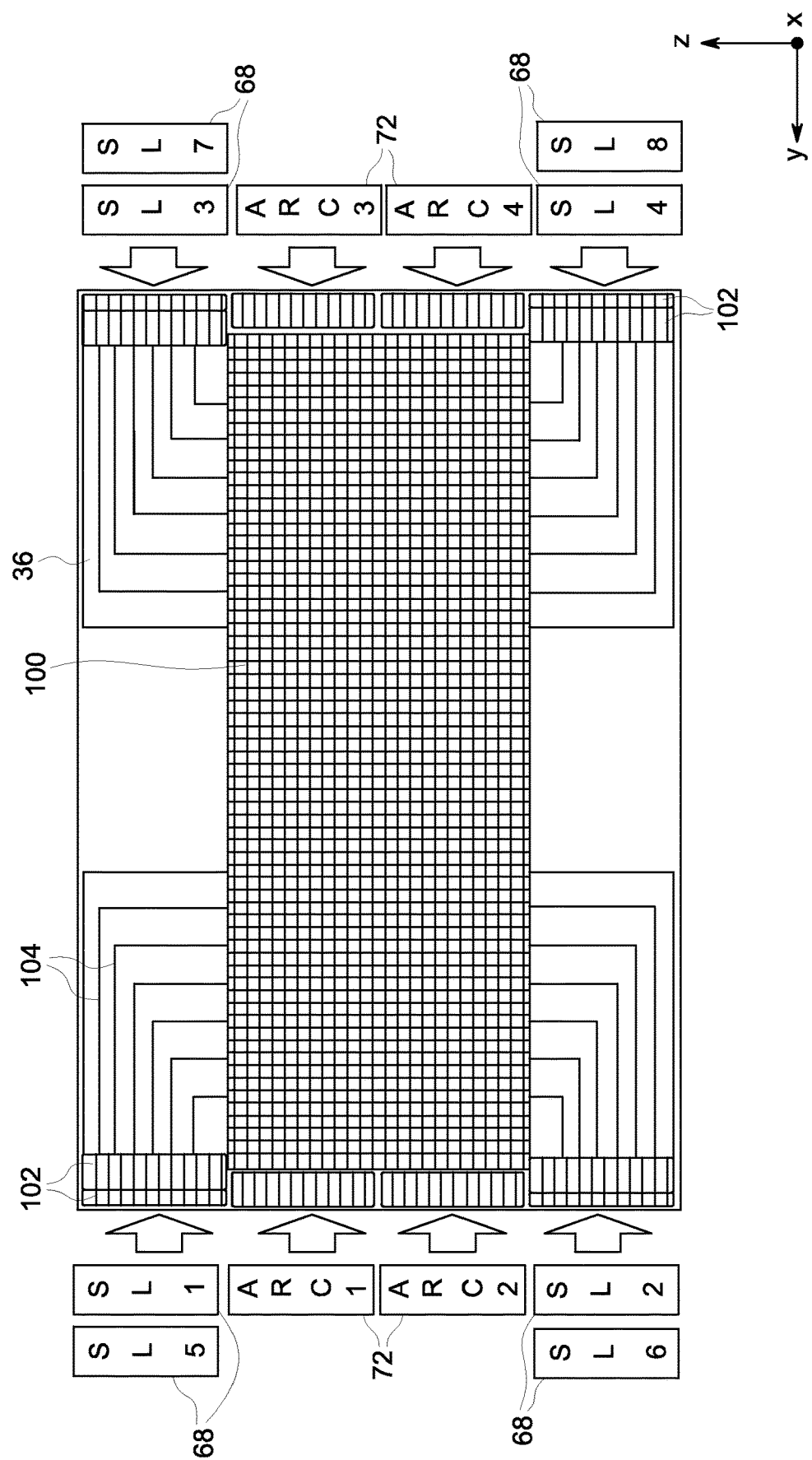
FIG. 15 depicts a fifth example of an arrangement of an active array, scan modules, and data modules, in accordance with an embodiment of the present disclosure.

Turning to FIG. 15, in this figure an implementation is depicted similar to the two preceding examples, but of different dimensions. In this example an active image array 100 having 150 μm pitch pixels (compared to the 200 μm and 100 μm pitch pixels in the preceding examples) is provided, with the active array 100 being approximately 4-6" by 12" (~10.2-15.2 cm by ~30.5 cm). In the depicted example, the substrate 36 on which the active array 100 is formed is approximately 13" by 8-10" (~33 cm by ~20.3-25.4 cm). The active array 100 is readout using 678-1,016 data lines and 2,032 scan lines such that four data modules 72 and eight scan modules 68 are employed, respectively, with the scan modules 68 being vertically stacked or tiered to fit within the limited space as in the preceding examples. Scan modules 68 and data modules 72 are respectively connected to the respective scan and data lines 50, 48 at connectors 102, with the connectors 102 serving the scan modules being tiered such that connections for one tiered connector are above the other. As in the two preceding examples, the data modules 72 and scan modules 68 are bonded to connectors 102 which run along an uncurved edge of the panel (i.e., in the z-direction), with the scan lines 50 being electrically connected to the respective connectors 102 by connection lines 104 which are formed so as to reach the "side-mounted" scan modules 68.

While the preceding relates various structural and fabrication aspects of a curved detector panel 64 incorporated into an X-ray sensor 22, as discussed herein, an example of the use of such a panel in an imaging system is discussed below. In this example, the X-ray sensor 22 is used for a digital weld inspection application, where the X-ray sensor 22 of the imaging system 10 may be fitted to a pipe 18 for assessment of the pipe or of welds connecting the pipe(s). During an image acquisition step, the X-ray sensor 22 may be attached or otherwise held in place relative to the pipe 18 by any suitable mechanism. As discussed above, such mechanisms include, but are not limited to: mounting straps, bungee or elastic cords, magnets, adhesives, snaps or other mechanical couplings, complementary hook-and-loop fasteners, and so forth. In this manner, the X-ray sensor 22 may be held in place relative to the pipe 18 while X-ray transmission data is acquired, without a user needing to remain in place during the imaging operation.

Figure 16:
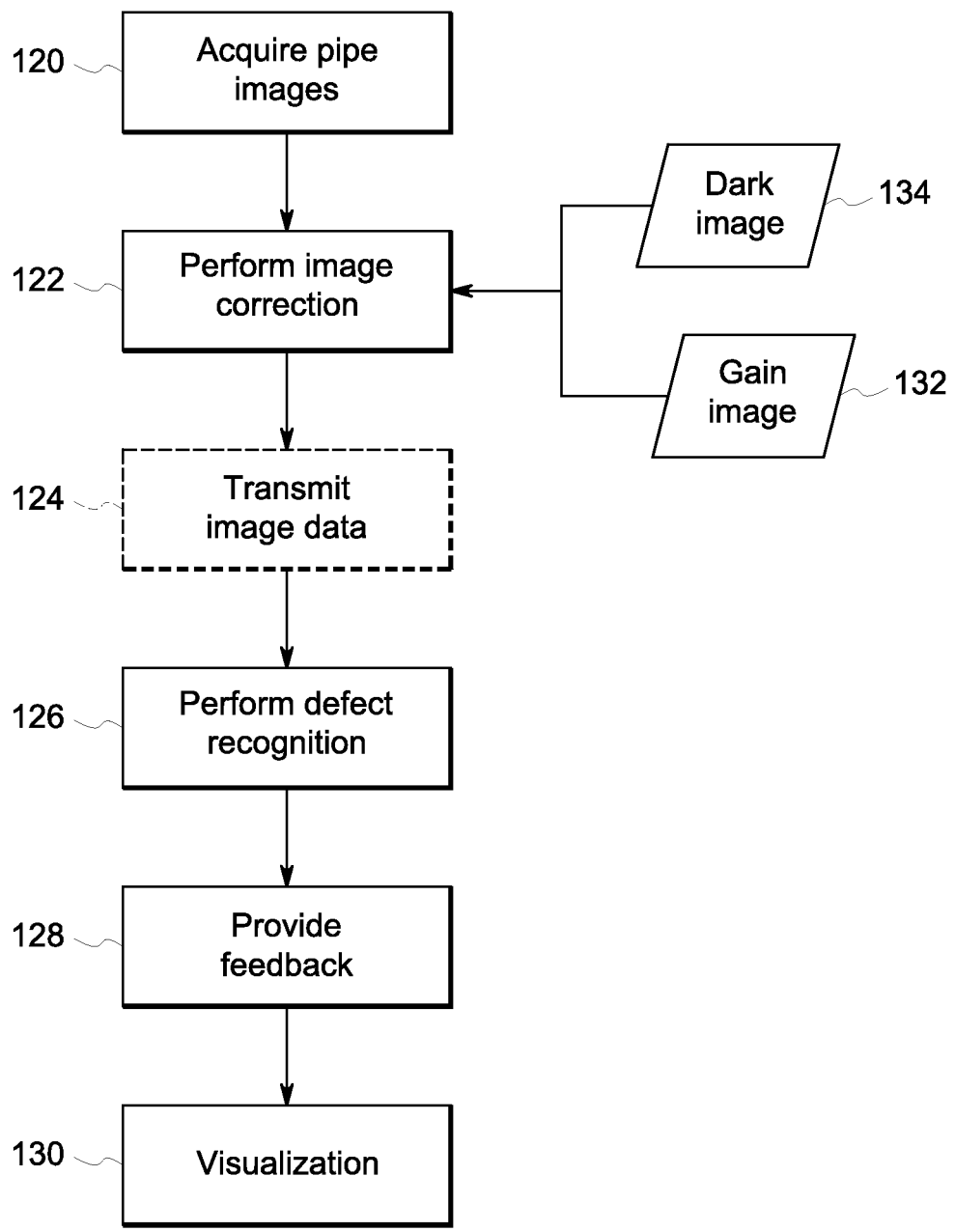
FIG. 16 illustrates a process flow diagram showing one example of a method for using a curved detector panel, in accordance with an embodiment of the present disclosure.

With this in mind, and turning to the flow chart shown in FIG. 16, at step 120 images of the pipe are acquired (block 120), such as at a weld site, using the imaging system 10. For example, in an image acquisition step the X-ray source is positioned with respect to the part (e.g., pipe 18) under inspection and held in place during irradiation. The X-ray sensor 22 is mounted in position and held in place during the acquisition. The sensor 22 or source 12, depending on the type of inspection and/or configuration of the source 12 or sensor 22, can be placed inside or outside of the part under inspection. When either the source 12 or sensor 22 is situated inside the pipe 18, only a single wall of the pipe will be imaged at a time. Conversely, if both the source 12 and sensor 22 are outside the pipe during imaging, X-ray transmission will be through opposing walls of the pipe during each image acquisition. If the sensor 22 is placed outside of the part, it may be secured to the pipe, for example by using mounting straps. Fiducials may be placed on or in the pipe for scale and image registration.

During image acquisition at step 120, the X-ray source 12 illuminates the part under inspection (e.g., pipe 18) while the X-ray sensor 22 accumulates X-ray signal. Typical acquisition frames for a digital X-ray detector can be up to 1 to 60 seconds. Following acquisition, the image is read out from the detector panel 64.

In practice, an image acquisition may involve taking a sequence or series of images (such as in a step-and-shoot process) as the X-ray sensor 22 is rotated about the weld location, depending on the usable field of view of the detector and the size and curvature of the pipe in question. By way of example, in one embodiment the X-ray exposures needed per pipe diameter and for different detector lengths (for certain embodiments of the present detector) is given by:

TABLE 1

| Pipe Diameter | Circumference | Exposures Needed | | |
|---|---|---|---|---|
| | | 8" Detector | 10" Detector | 12" Detector |
| 8" | 25.1" | 3.14 → 4 | 2.51 → 3 | 2.09 → 3 |
| 10" | 31.4" | 3.93 → 4 | 3.14 → 4 | 2.62 → 3 |
| 12" | 37.7" | 4.71 → 5 | 3.77 → 4 | 3.14 → 4 |

For a given weld inspection, fiducials on the pipe may be used to register the sequence of images to allow compilation of a panoramic image or to otherwise allow proper evaluation of the images taken of the respective weld.

As part of the weld inspection process, the X-ray images acquired may undergo some degree of image correction by the imaging system 10. For example, as shown as block 122, various correction steps may be performed to condition the acquired image data. By way of example, in one implementation, prior to acquiring the pipe images at step 120, a dark image 134 may be acquired from the detector panel 64 in the absence of emitted X-rays. Similarly, a gain image 132 may be acquired by illuminating the detector panel 64 with X-ray at a specified distance and in the absence of the pipe 18. These two images may be used to perform correction including, but not limited to, dark offset correction, gain calibration, and/or bad pixel correction.

In addition, FIG. 16 shows an optional step of data transmission (block 124) that may be performed as part of the inspection process. In such a step acquired image data, either before or after correction may be transmitted (such as via a wired or wireless network connection) to an offsite location for storage or analysis. In this manner, acquired images may be archived or otherwise provided for offsite analysis and review or for maintaining an offsite record.

In the depicted example, the acquired X-ray images of the pipe or pipe weld may be subjected to automatic defect recognition by the imaging system 10 at block 126 to detect part sizes and abnormal features. Such routines may automatically determine the dimensions of the feature (e.g., weld fillet) being inspected. In addition, such routines may detect or flag for review defects (e.g., corrosion, wear, cracks, and so forth) in the inspected feature and/or pipe regions for further review or analysis, including review by a trained technician.

At step 128, algorithms executing on the imaging system 10 may provide user feedback about the current weld inspection round, such as instructions to retake one or more of the X-ray exposures, one or more indications of pipe integrity, weld quality, corrosion or wear, or other pipe quality metrics. Similarly, in certain embodiments, the system 10 may display feature location in the acquired images in conjunction with a CAD overlay showing features or areas within the images for review by a technician. That is, the images may be shown with one or more visual indications to show regions or features of interest for review by the technician. In the depicted example, a visualization step 130 is also performed in which the acquired images, and possibly one or more analytic indicators, are displayed for review.

It should be appreciated that, though the present example list various steps and actions as being performed in a given sequence. In practice, certain of the steps may be performed in different order or may be performed in parallel. For example, a visualization step may be performed prior to defect recognition or feedback. Likewise, visualization may be performed in parallel with defect recognition or feedback provision.

Technical effects of the embodiments include fabrication and use of a curved X-ray detector panel, suitable for use in imaging pipes or other curved objects to which the curved detector may be fitted. Certain technical effects include, but are not limited to, X-ray inspection of pipes and pipe welds.

This written description uses examples to disclose the embodiments, including the best mode, and also to enable any person skilled in the art to practice the embodiments, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for imaging a pipe, comprising:
   positioning an interchangeable curved X-ray sensor of a portable digital detector with respect to a portion of a pipe to be imaged, wherein the X-ray sensor comprises:
      a curved detector panel comprising an array of pixels configured to generate a plurality of signals in response to incident X-rays, wherein the array of pixels are coupled to an array of transistors configured to receive a plurality of input signals via a series of scan lines and generate a plurality of output signals via a series of data readout lines, and
      a series of scan modules and a series of data modules, wherein the series of scan modules are configured to connect to the series of scan lines of the X-ray sensor and generate the plurality of input signals, and wherein the series of data modules are configured to connect to the series of data readout lines of the X-ray sensor and receive the plurality of output signals;
   positioning the series of scan modules along a curvature of the detector panel;
   positioning the series of data modules along a length of the pipe;
   operating the series of scan lines and the series of data readout lines using the series of scan modules and the series of data modules respectively;
   reading out digital signals from the curved X-ray sensor corresponding to the incidence of X-rays transmitted through the portion of the pipe; and
   generating one or more images based on the digital signals, wherein the one or more images depict X-ray transmission through the portion of the pipe,
   wherein the array of pixels have a pitch greater than about 100 µm, and
   wherein a resolution of the curved detector panel is greater than about 500 pixels by about 1000 pixels.

2. The method of claim 1, wherein positioning the curved X-ray sensor comprises attaching the curved X-ray sensor to an external surface of the pipe.

3. The method of claim 1, wherein positioning the curved X-ray sensor comprises moving and orienting the curved X-ray sensor within the pipe.

4. The method of claim 1, wherein the digital signals read out from the curved X-ray sensor correspond to an X-ray transmitted through a single wall of the pipe.

5. The method of claim 1, wherein the digital signals read out from the curved X-ray sensor correspond to an X-ray transmitted through opposing walls of the pipe.

6. The method of claim 1, wherein the portion of the pipe contains a weld fillet.

7. The method of claim 1, wherein the curved X-ray sensor comprises at least readout electronics, and a housing.

8. The method of claim 1, further comprising:
   selecting the curved X-ray sensor from among two or more curved X-ray sensors, wherein each of the two or more curved X-ray sensors are shaped or curved differently; and
   attaching the selected curved X-ray sensor to the portable digital detector prior to placing the curved X-ray sensor against the portion of the pipe.

9. The method of claim 1, further comprising:
performing image correction on the digital signals prior to generating the one or more images.

10. The method of claim 1, further comprising:
performing automatic defect recognition on the digital signals or on corrected versions of the digital signals, wherein the automatic defect recognition detects abnormal features of the pipe or a weld in the pipe; and
generating feedback based on the automatic defect recognition, wherein the feedback comprises one of an instruction to re-image the portion of the pipe, an indication of pipe or weld integrity, a weld quality metric or measurement, a corrosion metric, or other pipe or weld quality metrics.

11. The method of claim 1, wherein generating the one or more images comprises generating a CAD overlay for display with the one or more images that show regions or features of interest for review.

12. A portable X-ray detector, comprising:
a housing comprising:
a power supply or power supply connector;
a connector assembly comprising complementary circuitry to receive digital signals from an interchangeable curved X-ray sensor; and
the interchangeable curved X-ray sensor, comprising:
a curved detector panel comprising an array of pixels configured to generate a plurality of signals in response to incident X-rays, wherein the array of pixels are coupled to an array of transistors configured to receive a plurality of input signals via a series of scan lines and generate a plurality of output signals via a series of data readout lines; and
one or more readout circuits configured to generate the digital signals based upon the signals generated by the detector panel, wherein the X-ray sensor comprises a series of scan modules and a series of data modules, wherein the series of scan modules are disposed along a curvature of the detector panel and configured to connect to the series of scan lines of the X-ray sensor and generate the plurality of input signals, and wherein the series of data modules are disposed along a length of the pipe and configured to connect to the series of data readout lines of the X-ray sensor and receive the plurality of output signals,
wherein the array of pixels have a pitch greater than about 100 µm, and
wherein a resolution of the curved detector panel is greater than about 500 pixels by about 1000 pixels.

13. The portable X-ray detector of claim 12, wherein the detector panel comprises at least:
a curved backing material;
a flexible substrate mounted to the backing material;
a light imager having a thin film transistor array and photodiode layer fabricated on the flexible substrate;
a scintillator disposed on the light imager; and
an environmental cover covering and sealing the scintillator and the light imager from the environment, and
wherein the flexible substrate comprises one or more of glass, plastic, metal, semiconductor, or composite materials.

14. A method for imaging a pipe, comprising:
selecting a curved X-ray sensor conforming in size and curvature to a pipe section;
attaching the selected curved X-ray sensor to a portable detector housing of a portable digital detector, wherein the portable detector housing comprises at least a readout circuitry and a power source for the selected curved X-ray sensor;
positioning the selected curved X-ray sensor, which is connected to the portable detector housing, against the pipe section;
acquiring a plurality signals from the selected curved X-ray sensor, which are generated in response to X-rays transmitted through the pipe section; and
analyzing data associated with the plurality signals or an image generated from the signals for a defect in the pipe section or a weld present in the pipe section,
wherein the X-ray sensor comprises:
a curved detector panel comprising an array of pixels configured to generate the plurality of signals in response to incident X-rays, wherein the array of pixels are coupled to an array of transistors configured to receive a plurality of input signals via a series of scan lines and generate a plurality of output signals via a series of data readout lines, a series of scan modules, and a series of data modules, wherein the series of scan modules are disposed along a curvature of the detector panel and configured to connect to the series of scan lines of the X-ray sensor and generate the plurality of input signals, and wherein the series of data modules are disposed along a length of the pipe and configured to connect to the series of data readout lines of the X-ray sensor and receive the plurality of output signals,
wherein the array of pixels have a pitch greater than about 100 µm, and
wherein a resolution of the curved detector panel is greater than about 500 pixels by about 1000 pixels.

15. The method of claim 14, further comprising:
moving the selected curved X-ray sensor about pipe section such that the signals are acquired in multiple steps.

16. The method of claim 14, further comprising:
performing one or more correction steps on the signals prior to analyzing the signals or generating the images from the signals.

17. The portable X-ray detector of claim 13, wherein the thin film transistor array comprises a plurality of transistors, wherein each of the plurality of transistors is in electrical communication with a respective read out circuit to generate at least one data read out line per row or column of the thin film transistor array, and
wherein each of the scan lines is in electrical communication with an input of each of the plurality of transistors and each of the data readout lines is connected to an output of each of the plurality of transistors, wherein the scan lines and the data readout lines extend perpendicularly to one another to define a grid around each of the plurality of transistors, and wherein the scan lines and the data readout lines are formed of conductive material that facilitates transmission of electrical signals from a controller to the input of each of the plurality of transistors.

18. The method of claim 1, wherein the pitch is one from the group consisting of 100 µm, 125 µm, 150 µm, and 200 µm,
wherein the resolution is one from the group consisting of 508 pixels by 1016 pixels, 512 pixels by 1536 pixels, 678 pixels by 2032 pixels, 814 pixels by 2032 pixels, and 1016 pixels by 2032 pixels,
wherein a size of the pixel array is one from the group consisting of about 4 inches by about 8 inches or about 10.2 cm by about 20 cm, about 4 inches by about 10 inches or about 10.2 cm by about 25.4 cm, about 4 inches by about 11.8 inches or about 10.2 cm by about 30 cm, about 4 inches by about 12 inches or about 10.2 cm by about 30.5 cm, about 5 inches by about 10 inches or about 12.7 cm by about 25.4 cm, and about 6 inches by about 12 inches or about 15.2 cm by about 30.5 cm, wherein a number of the data modules is 2 or 4, and wherein a number of the scan modules is 4, 6 or 8.

19. The portable X-ray detector of claim 12, wherein the pitch is one from the group consisting of 100 µm, 125 µm, 150 µm, and 200 µm, wherein the resolution is one from the group consisting of 508 pixels by 1016 pixels, 512 pixels by 1536 pixels, 678 pixels by 2032 pixels, 814 pixels by 2032 pixels, and 1016 pixels by 2032 pixels, wherein a size of the pixel array is one from the group consisting of about 4 inches by about 8 inches or about 10.2 cm by about 20 cm, about 4 inches by about 10 inches or about 10.2 cm by about 25.4 cm, about 4 inches by about 11.8 inches or about 10.2 cm by about 30 cm, about 4 inches by about 12 inches or about 10.2 cm by about 30.5 cm, about 5 inches by about 10 inches or about 12.7 cm by about 25.4 cm, and about 6 inches by about 12 inches or about 15.2 cm by about 30.5 cm, wherein a number of the data modules is 2 or 4, and wherein a number of the scan modules is 4, 6 or 8.

20. The method of claim 14, wherein the pitch is one from the group consisting of 100 µm, 125 µm, 150 µm, and 200 µm, wherein the resolution is one from the group consisting of 508 pixels by 1016 pixels, 512 pixels by 1536 pixels, 678 pixels by 2032 pixels, 814 pixels by 2032 pixels, and 1016 pixels by 2032 pixels, wherein a size of the pixel array is one from the group consisting of about 4 inches by about 8 inches or about 10.2 cm by about 20 cm, about 4 inches by about 10 inches or about 10.2 cm by about 25.4 cm, about 4 inches by about 11.8 inches or about 10.2 cm by about 30 cm, about 4 inches by about 12 inches or about 10.2 cm by about 30.5 cm, about 5 inches by about 10 inches or about 12.7 cm by about 25.4 cm, and about 6 inches by about 12 inches or about 15.2 cm by about 30.5 cm, wherein a number of the data modules is 2 or 4, and wherein a number of the scan modules is 4, 6 or 8.

* * * * *